(12) United States Patent
Liu et al.

(10) Patent No.: US 11,290,375 B2
(45) Date of Patent: Mar. 29, 2022

(54) DYNAMIC DEPLOYMENT OF NETWORK APPLICATIONS HAVING PERFORMANCE AND RELIABILITY GUARANTEES IN LARGE COMPUTING NETWORKS

(71) Applicant: RISE Research Institutes of Sweden AB, Borås (SE)

(72) Inventors: Shaoteng Liu, Sundbyberg (SE); Rebecca Steinert, Grödinge (SE); Dejan Kostic, Solna (SE)

(73) Assignee: RISE Research Institutes of Sweden AB, Boras (SE)

(*) Notice: Subject to any disclaimer, the term of this patent is extended or adjusted under 35 U.S.C. 154(b) by 180 days.

(21) Appl. No.: 16/745,477

(22) Filed: Jan. 17, 2020

(65) Prior Publication Data
US 2020/0236038 A1 Jul. 23, 2020

Related U.S. Application Data

(60) Provisional application No. 62/793,919, filed on Jan. 18, 2019.

(51) Int. Cl.
| | | |
|---|---|---|
| H04L 12/717 | (2013.01) | |
| H04L 12/26 | (2006.01) | |
| H04L 12/751 | (2013.01) | |
| H04L 12/725 | (2013.01) | |
| H04L 45/42 | (2022.01) | |

(Continued)

(52) U.S. Cl.
CPC .......... *H04L 45/42* (2013.01); *H04L 43/0817* (2013.01); *H04L 43/0852* (2013.01); *H04L 43/50* (2013.01); *H04L 45/02* (2013.01); *H04L 45/302* (2013.01)

(58) Field of Classification Search
CPC combination set(s) only.
See application file for complete search history.

(56) References Cited

U.S. PATENT DOCUMENTS 8,990,397 B2    3/2015  Yeow et al.
2010/0290336 A1* 11/2010  Frantz .................... H04L 41/00
                                              370/217

(Continued)

FOREIGN PATENT DOCUMENTS

| CN | 205071038 U | 3/2016 |
| CN | 201710418627 | 6/2017 |
| CN | 201810089181 | 1/2018 |

OTHER PUBLICATIONS

The internet topology zoo, 2011.
(Continued)

*Primary Examiner* — Xavier S Wong
(74) *Attorney, Agent, or Firm* — AWA Sweden AB; Thomas L. Ewing

(57) ABSTRACT

Embodiments of the invention relate to computerized systems and computerized methods configured to optimize data transmission paths in a large-scale computerized network relative to reliability and bandwidth requirements. Embodiments of the invention further relate to computerized systems and methods that direct and control the physical adjustments to data transmission paths in a large-scale network's composition of computerized data transmission nodes in order to limit data end-to-end transmission delay in a computerized network to a delay within a calculated worst-case delay bound.

20 Claims, 7 Drawing Sheets

(51) Int. Cl.
| | |
|---|---|
| H04L 43/0817 | (2022.01) |
| H04L 43/0852 | (2022.01) |
| H04L 43/50 | (2022.01) |
| H04L 45/02 | (2022.01) |
| H04L 45/302 | (2022.01) |

(56) References Cited

U.S. PATENT DOCUMENTS

| | | | |
|---|---|---|---|
| 2013/0024579 A1 | 1/2013 | Zhang et al. | |
| 2015/0036536 A1* | 2/2015 | Kumar | H04L 45/06 370/254 |
| 2016/0226701 A1 | 8/2016 | Luo et al. | |
| 2016/0323144 A1 | 11/2016 | Luo et al. | |
| 2017/0033976 A1* | 2/2017 | Ahmed | H04L 41/0836 |
| 2018/0006928 A1 | 1/2018 | Luo et al. | |

OTHER PUBLICATIONS

Openflow switch specification v1.2, 2011., Available: https://www.opennetworking.org/.

B. Addis, D. Belabed, M. Bouet, and S. Secci. Virtual network functions placement and routing optimization. In CloudNet, pp. 171-177, 2015.

R. Agrawal, R. L. Cruz, C. Okino, and R. Rajan. Performance bonds for flow control protocols. IEEE/ACM Transactions on Networking (TON), 7(3):310-323, 1999.

R. K. Ahuja, T. L. Magnanti, and J. B. Orlin. Network flows: theory, algorithms, and applications. pp. 649-686, 1993.

A. Auger and B. Doerr. Theory of randomized search heuristics: Foundations and recent developments, vol. 1. World Scientific, 2011.

M. F. Bari, A. R. Roy, S. R. Chowdhury, Q. Zhang, M. F. Zhani, R. Ahmed, and R. Boutaba. Dynamic controller provisioning in software defined networks. In Proc. CNSM, pp. 18-25. IEEE, 2013.

P. Berde, M. Gerola, J. Hart, Y. Higuchi, M. Kobayashi, T. Koide, B. Lantz, B. O'Connor, P. Radoslavov, W. Snow, et al. Onos: towards an open, distributed sdn os. In Proc. workshop on Hot topics in software defined networking, pp. 1-6. ACM, 2014.

Spark architecture, 2018.

A. Bianco, P. Giaccone, A. Mahmood, M. Ullio, and V. Vercellone. Evaluating the sdn control traffic in large isp networks. In Proc. ICC, pp. 5248-5253. IEEE, 2015.

O. Biran, A. Corradi, M. Fanelli, L. Foschini, A. Nus, D. Raz, and E. Silvera. A stable network-aware vm placement for cloud systems. In Cluster, Cloud and Grid Computing (CCGrid), 2012 12th IEEE/ACM International Symposium on, pp. 498-506. IEEE, 2012.

A. Corana, M. Marchesi, C. Martini, and S. Ridella. Minimizing multimodal functions of continuous variables with the "simulated annealing" algorithm corrigenda for this article is available here. ACM Transactions on Mathematical Software (TOMS), 13(3):262-280, 1987.

T. H. Cormen. Introduction to algorithms. MIT press, 2009.

R. L. Cruz. A calculus for network delay. i. network elements in isolation. IEEE Transactions on information theory, 37(1):114-131, 1991.

L. Cui, F. P. Tso, D. P. Pezaros, W. Jia, and W. Zhao. Plan: Joint policy-and network-aware vm management for cloud data centers. IEEE Transactions on Parallel and Distributed Systems, 28(4):1163-1175, 2017.

W. Fang, X. Liang, S. Li, L. Chiaraviglio, and N. Xiong. Vmplanner: Optimizing virtual machine placement and traffic flow routing to reduce network power costs in cloud data centers. Computer Networks, 57(1):179-196, 2013.

M. H. Ferdaus, M. Murshed, R. N. Calheiros, and R. Buyya. An algorithm for network and data-aware placement of multi-tier applications in cloud data centers. Journal of Network and Computer Applications, 98:65-83, 2017.

N. Garg and J. Koenemann. Faster and simpler algorithms for multicommodity flow and other fractional packing problems. SIAM Journal on Computing, 37(2):630-652, 2007.

M. Ghaznavi, A. Khan, N. Shahriar, K. Alsubhi, R. Ahmed, and R. Boutaba. Elastic virtual network function placement. In Cloud Networking (CloudNet), 2015 IEEE 4th International Conference on, pp. 255-260. IEEE, 2015.

B. Heller, R. Sherwood, and N. McKeown. The controller placement problem. In Proc. HotSDN, pp. 7-12. ACM, 2012.

D. Hock, S. Gebert, M. Hartmann, T. Zinner, and P. Tran-Gia. Poco-framework for paretooptimal resilient controller placement in sdn-based core networks. In Proc. NOMS, pp. 1-2. IEEE, 2014.

D. Hock, M. Hartmann, S. Gebert, M. Jarschel, T. Zinner, and P. Tran-Gia. Pareto-optimal resilient controller placement in sdn-based core networks. In Proc. ITC, pp. 1-9. IEEE, 2013.

Y. Hu, W. Wang, X. Gong, X. Que, and S. Cheng. On reliability-optimized controller placement for software-defined networks. China Communications, 11(2):38-54, 2014.

Y. Hu, W. Wendong, X. Gong, X. Que, and C. Shiduan. Reliability-aware controller placement for software-defined networks. In Proc. International Symposium on Integrated Network Management (IM 2013), pp. 672-675. IEEE, 2013.

N. Jain. Managing a cluster of switches using multiple controllers, Jul. 25, 2013. U.S. Appl. No. 13/557,105.

Y. Jiang. Relationship between guaranteed rate server and latency rate server. Computer Networks, 43(3):307-315, 2003.

Y. Jiang and Y. Liu. Stochastic network calculus, vol. 1. Springer, 2008.

Y. Jimenez, C. Cervello-Pastor, and A. J. Garcia. On the controller placement for designing a distributed sdn control layer. In Proc. Networking Conference, pp. 1-9. IEEE, 2014.

D. Kakadia, N. Kopri, and V. Varma. Network-aware virtual machine consolidation for large data centers. In Proceedings of the Third International Workshop on Network-Aware Data Management, p. 6. ACM, 2013.

G. Karakostas. Faster approximation schemes for fractional multicommodity flow problems. Transactions on Algorithms (TALG), 4(1):13, 2008.

S. Kirkpatrick, C. D. Gelatt, M. P. Vecchi, et al. Optimization by simulated annealing. science, 220(4598):671-680, 1983.

T. Koponen, M. Casado, N. Gude, J. Stribling, L. Poutievski, M. Zhu, R. Ramanathan, Y. Iwata, H. Inoue, T. Hama, et al. Onix: A distributed control platform for large-scale production networks. In Proc. OSDI, vol. 10, pp. 1-6, 2010.

S. Lange, S. Gebert, T. Zinner, P. Tran-Gia, D. Hock, M. Jarschel, and M. Hoffmann. Heuristic approaches to the controller placement problem in large scale sdn networks. Transactions on Network and Service Management, 12(1):4-17, 2015.

J.-Y. Le Boudec and P. Thiran. Network calculus: a theory of deterministic queuing systems for the internet, vol. 2050. Springer Science & Business Media, 2001.

D. Levin, A. Wundsam, A. Feldmann, S. Seethamaran, M. Kobayashi, and G. Parulkar. A first look at openflow control plane behavior from a test deployment. Technical report, No. 2011/13 2011.

H. Zhang. Service disciplines for guaranteed performance service in packet-switching networks. Proceedings of the IEEE, 83(10):1374-1396, 1995.

X. Li and C. Qian. Traffic and failure aware vm placement for multi-tenant cloud computing. In Quality of Service (IWQoS), 2015 IEEE 23rd International Symposium on, pp. 41-50. IEEE, 2015.

X. Meng, V. Pappas, and L. Zhang. Improving the scalability of data center networks with traffic-aware virtual machine placement. In INFOCOM, 2010 Proceedings IEEE, pp. 1-9. IEEE, 2010.

L. F. Müller, R. R. Oliveira, M. C. Luizelli, L. P. Gaspary, and M. P. Barcellos. Survivor: an enhanced controller placement strategy for improving sdn survivability. In Proc. GLOBECOM, pp. 1909-1915. IEEE, 2014.

A. S. Muqaddas, A. Bianco, and P. Giaccone. Inter-controller traffic in onos clusters for sdn networks, 2016.

A. S. Muqaddas, A. Bianco, P. Giaccone, and G. Maier. Inter-controller traffic in onos clusters for sdn networks. In Proc. ICC, pp. 1-6. IEEE, 2016.

(56) References Cited

OTHER PUBLICATIONS

J. T. Piao and J. Yan. A network-aware virtual machine placement and migration approach in cloud computing. In Grid and Cooperative Computing (GCC), 2010 9th International Conference on, pp. 87-92. IEEE, 2010.
F. J. Ros and P. M. Ruiz. Five nines of southbound reliability in software-defined networks. In Proc. workshop on Hot topics in software defined networking, pp. 31-36. ACM, 2014.
F. J. Ros and P. M. Ruiz. On reliable controller placements in software-defined networks. Computer Communications, 77:41-51, 2016.
Liu, Shaoteng, R. Steinert, and D. Kostic. Flexible distributed control plane deployment. In IEEE/IFIP Network Operations and Management Symposium (NOMS), pp. 1-7, 2018.
S. N. Srirama and A. Ostovar. Optimal resource provisioning for scaling enterprise applications on the cloud. In Cloud Computing Technology and Science (CloudCom), 2014 IEEE 6th International Conference on, pp. 262-271. IEEE, 2014.
D. Turner, K. Levchenko, A. C. Snoeren, and S. Savage. California fault lines: understanding the causes and impact of network failures. In SIGCOMM Computer Communication Review, vol. 40, pp. 315-326. ACM, 2010.
A. Van Bemten and W. Kellerer. Network calculus: A comprehensive guide. 2016.
G. Yao, J. Bi, Y. Li, and L. Guo. On the capacitated controller placement problem in software defined networks. Communications Letters, 18(8):1339-1342, 2014.
M. Xia, M. Shirazipour, Y. Zhang, H. Green, and A. Takacs. Network function placement for nfv chaining in packet/optical datacenters. Journal of Lightwave Technology, 33(8):1565-1570, 2015.
Hu Tao; Guo Zehua; Yi Peng; Baker Thar; Lan Julong, 2016 IEEE Conference on Network Function Virtualization and Software Defined Networks (NFV-SDN), Nov. 7, 2016 IEEE, vol. No. 87-92 [http://dx.doi.org/10.1109/NFV-SDN.2016.7919481].
Zhang Tianzhu; Giaccone Paolo; Bianco Andrea; De Domenico Samuele, IEEE Access IEEE, USA, vol. 6, No. 15980-15996 [http://dx.doi.org/10.1109/ACCESS.2018.2814738].
Zhang Tianzhu; Giaccone Paolo; Bianco Andrea; De Domenico Samuele, Computer Communications Elsevier Science Publishers BV, Amsterdam, NL, vol. 113, No. 1-13 [http://dx.doi.org/10.1016/j.comcom.2017.09.007].
T. Zhang, A. Bianco, and P. Giaccone, "The role of inter-controller traffic in sdn controllers placement," in Proc. NFV-SDN, Nov. 2016, pp. 87-92.
A. Sallahi and M. St-Hilaire, "Optimal model for the controller placement problem in software defined networks," Communications Letters, vol. 19, No. 1, pp. 30-33, 2015.
Y. Zhang, N. Beheshti, and M. Tatipamula, "On resilience of splitarchitecture networks," in Proc. GLOBECOM 2011. IEEE, 2011, pp. 1-6.
Q. Zhong, Y. Wang, W. Li, and X. Qiu, "A min-cover based controller placement approach to build reliable control network in sdn," in Proc. NOMS. IEEE, 2016, pp. 481-487.
S. Kandula, D. Katabi, S. Sinha, and A. Berger, "Dynamic load balancing without packet reordering," SIGCOMM Computer Communication Review, vol. 37, No. 2, pp. 51-62, 2007.
M. Zhang, C. Yi, B. Liu, and B. Zhang, "Greente: Power-aware traffic engineering," in in Proc. ICNP. IEEE, 2010, pp. 21-30.
J. W. Rupe, "Reliability of computer systems and networks fault tolerance, analysis, and design," IIE Transactions, vol. 35, No. 6, pp. 586-587, 2003.
S. Agarwal, M. Kodialam, and T. Lakshman, "Traffic engineering in software defined networks," in In Proc. INFOCOM. IEEE, 2013, pp. 2211-2219.
R. Impagliazzo, S. Lovett, R. Paturi, and S. Schneider, "0-1 integer linear programming with a linear number of constraints," arXiv preprint arXiv:1401.5512, 2014.

L. S. d. Oliveira and S. F. Saramago, "Multiobjective optimization techniques applied to engineering problems," Journal of the brazilian society of mechanical sciences and engineering, vol. 32, No. 1, pp. 94-105, 2010.
A. Bianco, P. Giaccone, R. Mashayekhi, M. Ullio, and V. Vercellone, "Scalability of onos reactive forwarding applications in isp networks," Computer Communications, vol. 102, pp. 130-138, 2017.
E. S. Elmallah, "Algorithms for k-terminal reliability problems with node failures," Networks, vol. 22, No. 4, pp. 369-384, 1992.
P. Hunt, M. Konar, F. P. Junqueira, and B. Reed, "Zookeeper: Wait-free coordination for internet-scale systems," in Proceedings of the USENIX Annual Technical Conference, 2010.
D. Bertsimas and J. Tsitsiklis, "Simulated annealing," Statistical Science, vol. 8, pp. 10-15, 1993.
I.-L. Wang, "Multicommodity network flows: A survey, part ii: Solution methods," International Journal of Operations Research, vol. 15, No. 4, pp. 155-173, 2018.
V. V. Vazirani, "Approximation algorithms," pp. 294-295, 2003.
M. Casado, M. J. Freedman, J. Pettit, J. Luo, N. McKeown, and S. Shenker, "Ethane: Taking control of the enterprise," in ACM SIGCOMM Computer Communication Review, vol. 37, No. 4. ACM, 2007, pp. 1-12.
K.-c. Lan and J. Heidemann, "A measurement study of correlations of internet flow characteristics," Computer Networks, vol. 50, No. 1, pp. 46-62, 2006.
L. R. Ford Jr and D. R. Fulkerson, "A suggested computation for maximal multi-commodity network flows," Management Science, vol. 5, No. 1, pp. 97-101, 1958.
D. E. Knuth, "The art of computer programming, vol. 3: Searching and sorting," Reading MA: Addison-Wisley, pp. 543-583, 1973.
G. P. Katsikas, "Nfv service chains at the speed of the underlying commodity hardware," Ph.D. dissertation, KTH Royal Institute of Technology, 2018.
J. W. Guck, A. Van Bemten, and W. Kellerer, "Detserv: Network models for real-time qos provisioning in sdn-based industrial environments," IEEE Transactions on Network and Service Management, vol. 14, No. 4, pp. 1003-1017, 2017.
L. Liao and V. C. Leung, "Genetic algorithms with particle swarm optimization based mutation for distributed controller placement in sdns," in 2017 IEEE Conference on Network Function Virtualization and Software Defined Networks (NFV-SDN). IEEE, 2017, pp. 1-6.
B. P. R. Killi, E. A. Reddy, and S. V. Rao, "Cooperative game theory based network partitioning for controller placement in sdn," in 2018 10th International Conference on Communication Systems & Networks (COMSNETS). IEEE, 2018, pp. 105-112.
K. S. Sahoo, S. Sahoo, A. Sarkar, B. Sahoo, and R. Dash, "On the placement of controllers for designing a wide area software defined networks," in TENCON 2017-2017 IEEE Region 10 Conference. IEEE, 2017, pp. 3123-3128.
S. Jiugen, Z. Wei, J. Kunying, and X. Ying, "Multi-controller deployment algorithm based on load balance in software defined network," Journal of Electronics & Information Technology, vol. 40, No. 2, pp. 455-461, 2018.
M. He, A. Basta, A. Blenk, and W. Kellerer, "Modeling flow setup time for controller placement in sdn: Evaluation for dynamic flows," in 2017 IEEE International Conference on Communications (ICC). IEEE, 2017, pp. 1-7.
D. M. Mattos, O. C. M. Duarte, and G. Pujolle, "A resilient distributed controller for software defined networking," in Communications (ICC), 2016 IEEE International Conference on. IEEE, 2016, pp. 1-6.
P. Vizarreta, C. M. Machuca, and W. Kellerer, "Controller placement strategies for a resilient sdn control plane," in Resilient Networks Design and Modeling (RNDM), 2016 8th International Workshop on. IEEE, 2016, pp. 253-259.
B. Gorkemli, S. Tatlicioglu, A. M. Tekalp, S. Civanlar, and E. Lokman, "Dynamic control plane for sdn at scale," IEEE Journal on Selected Areas in Communications, vol. 36, No. 12, pp. 2688-2701, 2018.
J. W. Guck, M. Reisslein, and W. Kellerer, "Function split between delay-constrained routing and resource allocation for centrally

(56) References Cited

OTHER PUBLICATIONS managed qos in industrial networks," IEEE Transactions on Industrial Informatics, vol. 12, No. 6, pp. 2050-2061, 2016.

Weizhe Zhang, Shuo Han, Hui He, Huixiang Chen, "Network-aware virtual machine migration in an overcommitted cloud," School of Computer Science and Technology, Harbin Institute of Technology, Harbin, 150001, China; Future Generation Computer Systems 76 (2017) 428-442.

Sanjeev Arora and Boaz Barak, Computational Complexity: A Modern Approach, Draft of a book: Dated Jan. 2007, Princeton University, complexitybook@gmail.com.

Liu, Shaoteng, Steinert, Rebecca, Kostic, Dejan, "Flexible distributed control plane deployment," 2018.

Steinert, Rebecca, Kostic, Dejan, Liu, Shaoteng, A method for deploying networking applications with performance requirements and reliability guarantees, 2019.

Hu, Tao, Yi, Peng, Zhang, Jianhui, Lan, Julong, Reliable and Load Balance-Aware Multi-Controller Deployment in SDD, 2017.

Zhang, Banf, Wang, Xingwei, Ma, Lianbo, Min Huang, Optimal Controller Placement Problem in Internet-Oriented Software Defined Network, 2016.

PCT/SE2020/050045, Search Report and Written Opinion, dated Jan. 17, 2020.

* cited by examiner

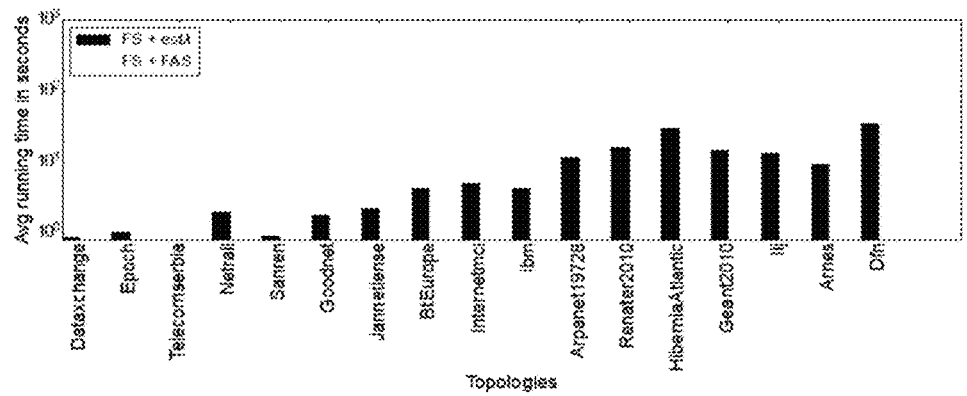
FIG. 01D
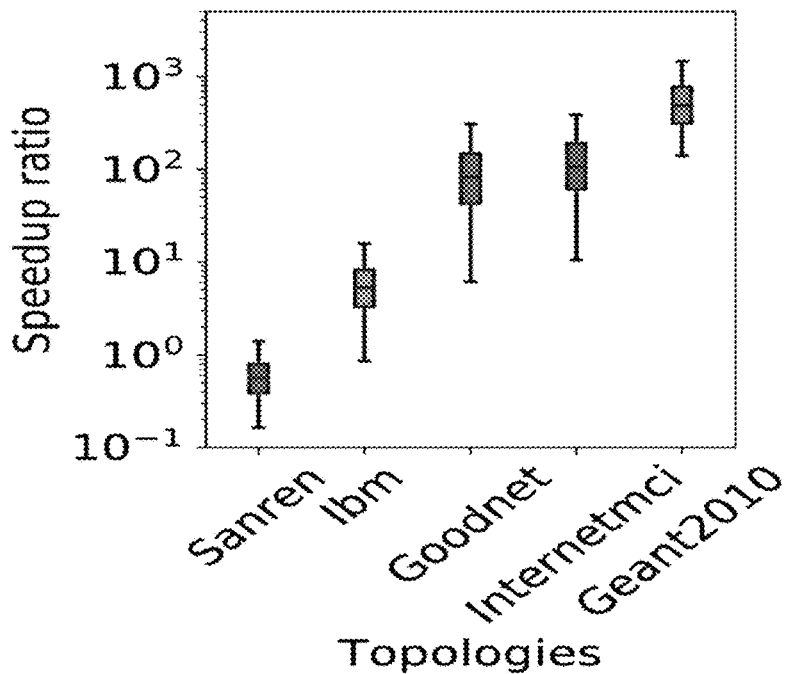
FIG. 01E
| Implementations | Running time Percentiles (0.5, 0.25, 0.75) |
|---|---|
| AA +est$\lambda$ + direct-CPLEX | > $10^5$ s |
| AA +est$\lambda$ + CGH | (2136.4 s, 1762.9 s, 4468.3 s) |
| FS +est$\lambda$ + direct-CPLEX | (1823.8 s, 825.3 s, 4414.0 s) |
| FS +est$\lambda$ + CGH | (22.2 s, 10.9 s, 22.3 s) |
FIG. 01F

DYNAMIC DEPLOYMENT OF NETWORK APPLICATIONS HAVING PERFORMANCE AND RELIABILITY GUARANTEES IN LARGE COMPUTING NETWORKS

FIELD

Embodiments of the invention relate to computerized systems and computerized methods configured to optimize data transmission paths in a large-scale computerized network relative to reliability and bandwidth requirements. Embodiments of the invention further relate to computerized systems and methods that direct and control physical adjustments to data transmission paths in a large-scale network's composition of computerized data transmission nodes in order to limit data end-to-end transmission delay in a computerized network to a delay within a calculated worst-case delay bound.

BACKGROUND

The following description includes information that may be useful in understanding embodiments of the invention. It is not an admission that any of the information provided herein is prior art or relevant to the presently claimed invention, or that any publication specifically or implicitly referenced is prior art.

Large communication networks, such as T-Mobile's North American network or Microsoft's cloud network, are among the most complex industrial systems to be found anywhere in the world today. Managing these large communication networks efficiently while also satisfying all the demands placed on them is obviously not a trivial problem to solve. Many computer engineers and other technical experts have worked tirelessly to improve these systems so that they will continue to operate as intended while also being able to accommodate the increasingly complicated demands placed on them.

Computerized control planes are known for various types of communications networks, particularly large communications networks. A control plane comprises the portion of a router architecture that is concerned with drawing the network topology and/or the information in a routing table that defines what to do with incoming data packets. Control planes decide which routes go into a main routing table for unicast routes and into additional routing tables for multicast routes.

Control planes can be applied to access networks of nearly all types. Control planes offer well-known advantages including, among the others, significant operating expense saving, capital expense savings, and improved traffic restoration. However, the control plane technology provides some challenges as well, such as scalability issues and low control of the network operator on the paths used by the traffic in end-to-end services with consequent lack of resource optimization.

Prior art solutions for control plane scalability generally focus on aspects such as electronic aggregator-to-processing entity or processing entity-to-electronic aggregator delay reduction, computerized processing entity capacity and utilization optimization, flow setup time and communication overhead minimization. While these efforts in the prior art have been helpful, they have not yet provided an optimal solution for the problems they attempt to solve.

For large-scale programmable networks, flexible deployment of distributed control planes is essential for service availability and performance. However, the solutions available in the prior art only focus on placing controllers whereas the consequent control traffic is often ignored, leading to numerous drawbacks.

Similarly, the next generation of networked systems will likely include programmable and virtualized infrastructures. The accelerated development of network programmability and virtualization is a reasonable and expected development, as commodity hardware becomes increasingly cheaper and the demand for elastic cloud services continues to grow. In distributed and networked environments, deployment of virtual instances requires a robust deployment strategy to ensure service reliability and performance, such as bandwidth and flow delay. Here, virtual instances comprise physical hardware that has been configured in a logical (or virtual) configuration to perform as if the composition of physical hardware was an integrated unit. As cloud services become central to the digital transformation in research, industry, and finance, it becomes of increasing importance to consider the service performance within and across geo-distributed data centers. Addressing these challenges is fundamental to elastic services entailing effective resource usage and service performance requirements.

The ability to flexibly plan and deploy virtualized infrastructures with performance guarantees is relevant to many networked systems that rely on virtual entities requiring reliable data transactions, such as:

software defined networks ("SDN") operating using distributed control planes;

network services implemented by virtual network functions ("VNF"); and cloud computing services running in distributed system architectures.

Common to these networked systems is the deployment of virtual entities (a virtual machine, a network controller instance or a virtual network function) which implement a service (cloud application, control service or network service). Coupled with digital transformation, there is a drastic increase in services centered around reliable data transactions with performance guarantees on bandwidth and flow delay.

In particular, flow delay is of growing importance as more services (e.g., Intelligent Transportation Systems ("ITS")) require short response times for close to real-time applications. Similarly, big data computations carried out across geo-distributed data centers may in many cases require guaranteed performance. Accordingly, the way cloud computing tasks have been planned and deployed will impact service performance with respect to how quickly and accurately a cloud computing result can be delivered (some results could get lost due to, e.g., link loss).

As networks and services grow more complex, automated deployment of virtualized infrastructures becomes essential. Methods and systems enabling automated deployment typically require the capability for taking performance guarantees and reliability requirements into account. Application areas or implementation of improved solutions include control plane deployments, cloud computing, and network function virtualization ("NFV").

While network control systems and services have improved in recent years, there nevertheless exists a continuous need to improve the design and operation of network control systems and services, especially where such improvements can be accomplished in a commercially reasonable fashion.

SUMMARY OF THE INVENTION

Embodiments of the invention provide an electronic data transmission scheduling system for a computer network having a plurality of computerized data transmission nodes and a plurality of electronic aggregators, wherein each computerized data transmission node of the plurality of computerized data transmission nodes has at least one data transmission link of a plurality of data transmission links to another computerized data transmission node of the plurality of computerized data transmission nodes, and wherein each electronic aggregator of the plurality of electronic aggregators forwards data to a set of computerized data transmission nodes of the plurality of computerized data transmission nodes, a configuration of the plurality of computerized data transmission nodes and the plurality of data transmission links collectively forming a network topology. Embodiments of the electronic data transmission scheduling system comprise an electronic reliability checker that examines possible data transmission routes between computerized data transmission nodes of the plurality of computerized data transmission nodes and data transmission links of the plurality of data transmission links to determine a network mapping reliability score for the network topology, wherein the reliable data transmission reliability represents a probability that an electronic aggregator of the plurality of the electronic aggregators connects to at least one computerized data transmission node of a set of computerized data transmission nodes given computerized data transmission node and data transmission link failure probabilities. Embodiments of the invention also include an electronic bandwidth checker configured to calculate bandwidth allocations for the network topology, wherein the electronic bandwidth checker develops calculated bandwidth allocations by testing different combinations of data transmission links from the plurality of data transmission links and different combinations computerized data transmission nodes of the plurality of computerized data transmission nodes. Embodiments of the invention further comprise an electronic resource planner that uses the network mapping reliability score from the electronic reliability checker, estimated traffic demands in the electronic resource planner and the calculated bandwidth allocations from the electronic bandwidth checker to develop a computer-implementable deployment strategy that directs rearrangement of the network topology by calculating a trade-off between the network mapping reliability score and the calculated bandwidth allocation that satisfies predetermined requirements for each of the network mapping reliability score and the bandwidth requirements.

Embodiments of the invention further comprise the electronic data transmission scheduling system described above that further comprises an electronic flow delay checker that determines an end-to-end delay of delivering a packet from a sending computerized data transmission node of the plurality of computerized processing nodes to a destination computerized data transmission node of the plurality of computerized processing nodes over at least one data transmission link of a plurality of data transmission links; wherein the electronic resource planner is further configured to use the end-to-end delay along with the network mapping reliability score from the electronic reliability checker and the calculated bandwidth allocations from the electronic bandwidth checker to develop a computer-implementable deployment strategy that directs rearrangement of the network topology by calculating trade-offs among the network mapping reliability score, the calculated bandwidth allocations, and the end-to-end delay that satisfies predetermined requirements for reliability, bandwidth and end-to-end delay.

Embodiments of the invention further provide a method for electronic data transmission scheduling for a computer network having a plurality of computerized data transmission nodes and a plurality of electronic aggregators, wherein each computerized data transmission node of the plurality of computerized data transmission nodes has at least one data transmission link of a plurality of data transmission links to another computerized data transmission node of the plurality of computerized data transmission nodes, and wherein each electronic aggregator of the plurality of electronic aggregators forwards data to a set of computerized data transmission nodes of the plurality of computerized data transmission nodes, a configuration of the plurality of computerized data transmission nodes and the plurality of data transmission links collectively forming a network topology. Embodiments of the method for electronic data transmission scheduling comprise examining possible data transmission routes between computerized data transmission nodes of the plurality of computerized data transmission nodes and data transmission links of the plurality of data transmission links by an electronic reliability checker that to determine a network mapping reliability score for the network topology, wherein the reliable data transmission reliability represents a probability that an electronic aggregator of the plurality of the electronic aggregators connects to at least one computerized data transmission node of a set of computerized data transmission nodes given computerized data transmission node and data transmission link failure probabilities. Embodiments of the method further comprise calculating bandwidth allocations for the network topology by an electronic bandwidth checker, wherein the electronic bandwidth checker develops flow routing plans and calculated bandwidth allocations by testing different combinations of data transmission links from the plurality of data transmission links and different combinations computerized data transmission nodes of the plurality of computerized data transmission nodes. Embodiments of the invention also comprise preparing a computer-implementable deployment strategy that directs rearrangement of the network topology by an electronic resource planner that uses the network mapping reliability score from the electronic reliability checker and the estimated traffic demands in the electronic resource planner to calculate trade-offs between the network mapping reliability score and the calculated bandwidth allocations, such that the computer-implementable deployment strategy satisfies predetermined requirements for reliability and bandwidth.

Embodiments of the invention comprise the method for electronic data transmission scheduling as described above and further comprise determining by an electronic flow delay checker an end-to-end delay of delivering a packet from a sending computerized data transmission node of the plurality of computerized processing nodes to a destination computerized data transmission node of the plurality of computerized processing nodes over at least one data transmission link of a plurality of data transmission links; wherein the electronic resource planner is further configured to use the end-to-end delay along with the network mapping reliability score from the electronic reliability checker, estimated traffic demands in the electronic resource planner and the calculated bandwidth allocation from the electronic bandwidth checker to develop a computer-implementable deployment strategy that directs rearrangement of the network topology by calculating trade-offs among the network mapping reliability score, the calculated bandwidth allocation, and the calculated end-to-end delay that satisfies predetermined requirements for reliability, bandwidth and end-to-end delay.

Embodiments of the invention further comprise a method for automatic monitoring and decision-making for dynamically triggering recalculations of the electronic data transmission scheduling determined by observed changes of the networking conditions. This automatic monitoring and decision-making method may be employed to further minimize time delays in data transmission. Further, embodiments of the invention comprise determining the power utilization of computerized data transmission processing nodes and computerized data transmission nodes, that are used or unused for electronic data transmission scheduling. Once the power utilization has been computed, then the power utilization data may be considered in the overall deployment of the data transmission scheme, according to an embodiment of the invention.

BRIEF DESCRIPTION OF THE DRAWINGS

Embodiments of the invention will be further explained by means of non-limiting examples with reference to the appended drawings. Figures provided herein may or may not be provided to scale. The relative dimensions or proportions may vary. It should be noted that the dimensions of some features of the present invention may have been exaggerated for the sake of clarity.

FIG. 01D Illustrates the optimization time with different implementations of the bandwidth verification when the FTCP heuristics (FS) is used for mapping and association, which are suitable with embodiments of the invention.

FIG. 01E illustrates a representative time reduction ratio when comparing the CGH algorithm with CPLEX for network topologies of increasing size for uniform traffic (left) and control traffic patterns (right), respectively, suited for embodiments of the invention.

FIG. 01F illustrates the time total running time for calculating a deployment plan for combinations of algorithms implementing various embodiments of the invention for one mid-sized topology.

DETAILED DESCRIPTION OF AN EMBODIMENT OF THE INVENTION

Figure 1A:
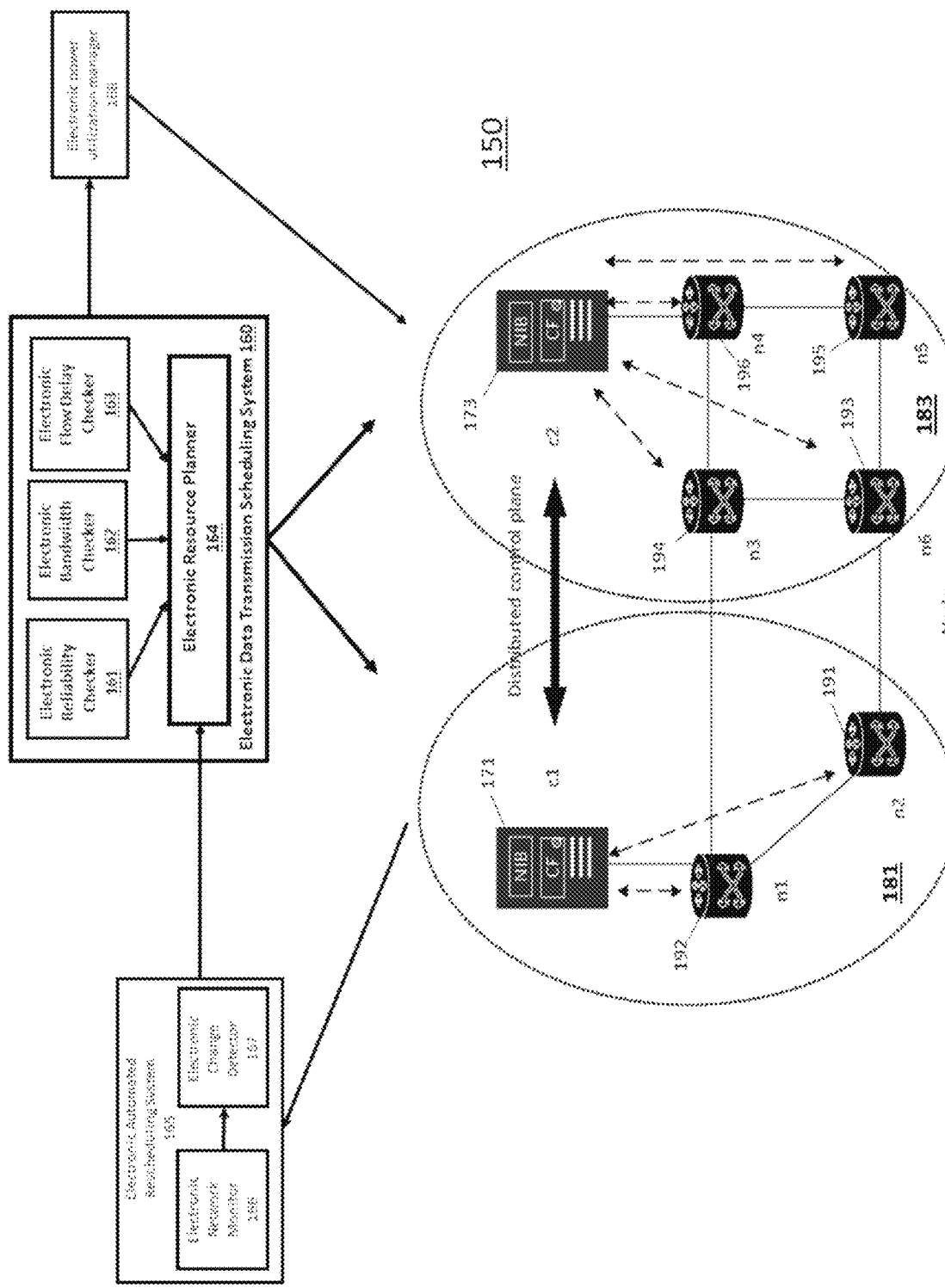
FIG. 01A illustrates an electronic data transmission scheduling system 160, according to an embodiment of the invention that operates with a computerized network 150 having a network topology.

Embodiments of the invention entail a computerized method and system that automates operation of a large network of distributed computerized processing entities that exchange information with each other in line with defined policies on bandwidth constraints, flow delay bounds and/or service reliability. An example for such a large network would be T-Mobile's North American network or Microsoft's cloud network.

Embodiments of the invention provide a computerized network management system or a computerized tool that systematically analyzes the impact of different computerized network or service deployments with respect to characteristics such as reliability, bandwidth, and flow delay. The output comprises a computer-operable and/or computer-implementable deployment strategy (or plan) that can be realized by having additional computing elements (or software in a computing element) initiate processing entities at planned locations along with the data flows following performance guarantees and reliability guarantees. The computer-implementable deployment strategy defines network and/or service control operations in line with calculated performance guarantees. Embodiments of the invention further relate to computerized systems and methods that direct and control the physical adjustments to data transmission paths in a large-scale network's composition of computerized data transmission nodes in order to limit data end-to-end transmission delay in the computerized network to within a calculated worst-case delay bound.

Embodiments of the invention may further provide a black-box optimization framework that provides a computerized method and system that quantifies the effect of the consequent control traffic when deploying a distributed control plane in a computerized network. Evaluating different computerized implementations of the framework over real-world computerized network topologies shows that close to optimal solutions may be achieved. Moreover, experiments using such large-scale network computerized systems indicate that applying a computerized method for controller placement without considering the control traffic, causes excessive bandwidth usage (worst cases varying between 20.1% to 50.1% higher bandwidth) and congestion when compared to various embodiments of the prior art, such as may be found in S. Liu, R. Steinert, and D. Kostic, "Flexible distributed control plane deployment," in NOMS 2018-2018 IEEE/IFIP Network Operations and Management Symposium. Mini conference. IEEE, 2018, pp. 1-7. To ensure resource efficiency, service reliability and guaranteed performance, deployment of distributed control planes (fundamental for scalable management of traffic over physical and virtual data transmission nodes) takes both placement and control traffic properties into account.

Embodiments of the invention provide: 1) a novel formalization of the problem of distributed control plane optimization, enabling 2) tuning of reliability and bandwidth requirements. By analyzing the challenges and complexity of the computerized processing entity placement and traffic routability problem, embodiments of the invention introduce a generic black-box optimization process formulated as a feasibility problem. For embodiments of the invention, a computerized processing entity comprises a computer capable of executing computer instructions implementing the formulas detailed here, and especially a computer networked with other computers. Thus, embodiments of the invention provide computerized systems that specify each step of the process along with guiding implementations. Embodiments of the invention may be implemented as specialized electronic control systems configured for physical attachment to the other elements comprising a computer network. As such, embodiments of the invention can be used for planning a physical computer network with respect to bandwidth, reliability and delay requirements. Similarly, the specific components for directing and controlling such a physical computer network may comprise specialized hardware and other electronic devices that monitor the physical computer network, make physical adjustments to the flow of data through the network, and otherwise direct the operations for such a physical computer network.

In contrast to the prior art, an embodiment of the optimization process detailed here adds additional steps for quantifying the consequences of deploying a control plane solution that predetermines reliability and bandwidth requirements. As a powerful computerized prediction tool, service providers and operators can use embodiments of the invention to fine-tune control plane deployment policies for application in their systems. In combination with the generic design of the black-box optimization process, many existing computerized methods can be adapted and employed for control plane optimization and service management.

Embodiments of the invention also provide a computerized method and a computerized system that provides a capability for identifying how computerized processing entities and electronic aggregators in a network may be deployed and connected in a computerized network topology to implement a distributed service that satisfies reliability and performance requirements. Embodiments of the invention may comprise specialized electronic components, specialized electronic circuits, specialized hardware, computerized software and/or hardware that may identify in/for a large computer network:
1. the set of computerized data transmission nodes operating as computerized processing entities;
2. the set of computerized data transmission nodes operating only as electronic aggregators and their association to computerized processing entities;
3. the connections between the computerized processing entities and the electronic aggregators; and
4. the routes of expected data flows, meeting the requirements on reliability, bandwidth and flow delay.

Embodiments of the invention further enable automated deployment of computerized processing entities and electronic aggregators in a computerized network topology considering reliability, bandwidth and flow delay that:
1. provides an optimized computer-implementable deployment strategy for the network in line with network operator specific requirements for flow delay, bandwidth or control service reliability;
2. predicts the demands on flow delay for an estimated computer-implementable deployment strategy given a fixed control service reliability and a fixed limit on bandwidth and a network topology;
3. predicts the demands on bandwidth for an estimated computer-implementable deployment strategy given a fixed control service reliability and a fixed limit on flow delay and a network topology;
4. predicts the achievable control service reliability for an estimated computer-implementable deployment strategy given fixed limits on flow delay and bandwidth and a network topology.

Embodiments of the invention enable guaranteed reliability in line with predetermined requirements and computerized systems executing the embodiments of the invention may output a deployment strategy that provides congestion-free connections between associated computerized processing entities and electronic aggregators in a manner that cannot be performed using prior art methods.

Relevant Terminology and Definitions

A computerized processing entity in a computerized network may be, e.g., a network controller; a computing unit (for example, a virtual machine "VM"); as well as a cluster of computerized processing entities (such as, a data center). A computerized processing entity may be virtual or physical. A virtual computerized processing entity comprises a collection of physical computerized processing entities configured to perform as if such systems comprises a unified entity. A network of distributed computerized processing entities may operate locally in a computerized network or computerized data center, or globally across geo-distributed computerized data centers.

An electronic aggregator comprises a computerized network entity processing that forwards network traffic (i.e., one or many network flows), e.g., a computerized gateway or a computerized network switch. An electronic aggregator may be, e.g., a computerized gateway, a computerized network switch, or a non-computerized device such as a field-programmable gate array (FPGA) that comprises an integrated circuit designed to be configured by a customer or a designer after manufacturing that contains an array of programmable logic blocks. An electronic aggregator may be virtual or physical. An electronic aggregator may include, for example, an OpenFlow switch in the context of Software-Defined Networks ("SDN") or a radio access point in a Software-Defined Radio Access Network ("SoftRAN") context. In any case, the electronic aggregator acts as a data forwarding device.

A data transmission node or network node or computerized data transmission node (the terms are synonymous) comprises a computerized network entity hosting an electronic aggregator. Suitable computerized network entities may include application-specific hardware. Put another way, a data transmission node includes at a minimum a central processing unit and related equipment (network connections, memory, etc.) needed for successful executing the programs to accomplish its predetermined tasks, such as hosting an electronic aggregator. A data transmission node may or may not host a computerized processing entity configured to perform additional tasks. A node may be virtual or physical. A virtual data transmission node nevertheless comprises a collection of physical entities configured to operate in a collective manner to perform a defined task.

A data transmission link or network link (the terms are synonymous) comprises a connection between computerized data transmission nodes and may be virtual or physical.

A virtual network link nevertheless comprises a collection of physical computing devices that have been arranged to perform a collective task.

A network link propagation delay refers to the signal propagation delay of the link.

A network topology comprises a set of interconnected computerized data transmission nodes via network links. Of course, the network topology may also include data transmission nodes comprised of application specific hardware. In short, the network topology here comprises a physical structure or a virtual structure (comprised of physical structures), and in all cases represents a physical entity and not a mere mathematical calculation.

Bandwidth refers to the amount of data that can be transmitted by a link during a time unit.

Figure 1B:
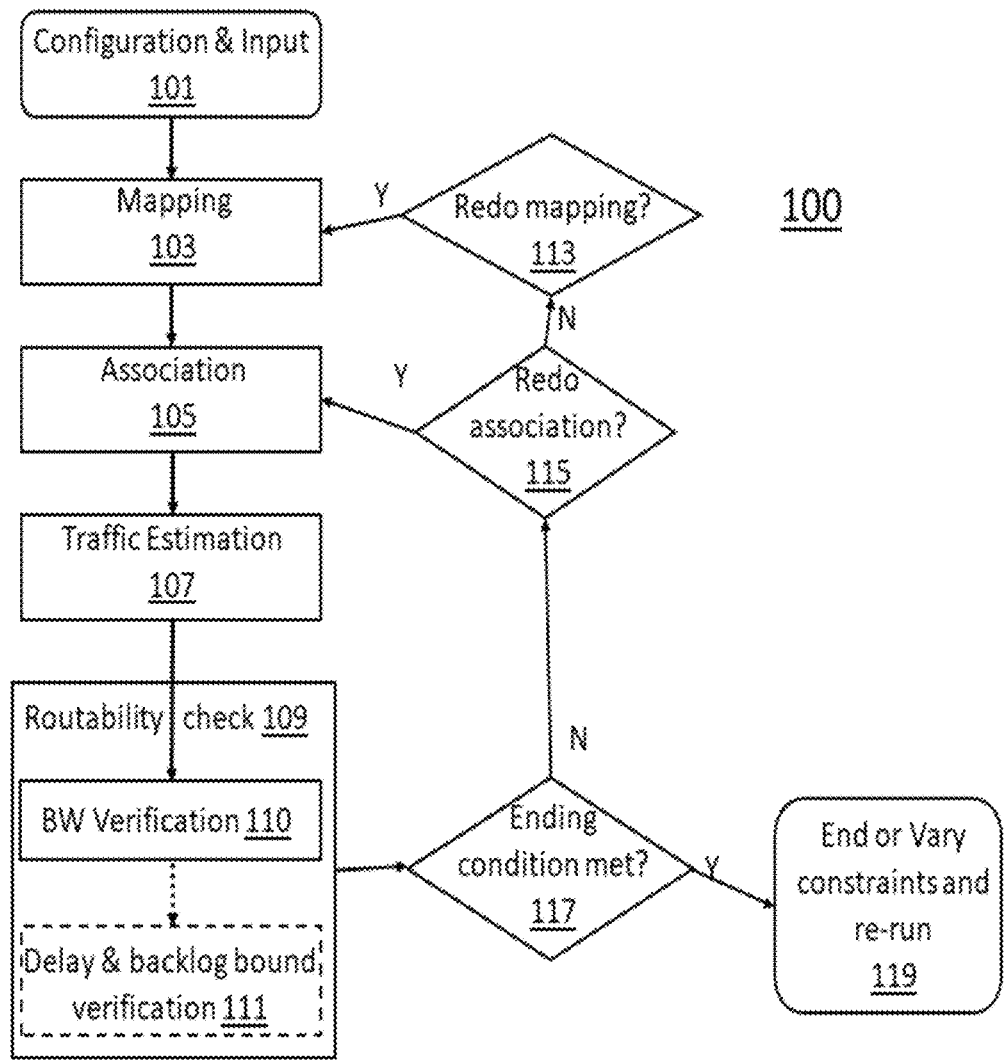
FIG. 01B illustrates a flowchart that outlines a solution to the problems overcome by embodiments of the invention that may be obtained in six (three plus three) iterative optimization steps carried out in line with the computerized workflow 100, according to an embodiment of the invention.

An electronic bandwidth checker calculates a routability indicator $\lambda$ in step 110 of FIG. 01B. In one embodiment of the invention, the electronic bandwidth checker may run algorithms such as FPTAS and est$\lambda$ (described herein below) for this purpose. The electronic bandwidth checker outputs the routability indicator to the electronic resource planner. The electronic bandwidth checker can also output the corresponding flow routing plan along with the calculated bandwidth allocation per network link for routable solutions following the bandwidth requirements.

A network flow comprises a stream of data packets.

Flow delay represents the end-to-end delay of delivering a packet of a certain flow from the source node (sender) to the destination node (receiver) over one or several physical or virtual links. A virtual link nevertheless comprises a series of physical entities configured to perform a particular task, as if these entities comprised a single entity.

An electronic flow delay checker computes a routability indicator $\chi$ in the Delay and Backlog Verification step 111 of FIG. 01B. The electronic flow delay checker calculates Delay and Backlog bounds according to a network calculus model. The electronic flow delay checker outputs the delay and backlog bounds and a routability indicator to the electronic resource planner. The checker can also output the corresponding flow routing plan along with the calculated bandwidth allocation per network link for routable solutions following the flow delay requirements.

Reliability is defined as the probability that an operational electronic aggregator is connected to at least one operational computerized processing entity, given data transmission node and link failure probabilities. Reliability guarantee corresponds to guaranteeing (deterministically or probabilistically) that a service request can be delivered to and handled by at least one computerized processing entity.

An electronic reliability checker comprises tests and estimates the failure probabilities of the network. The electronic reliability checker calculates a reliability score R, which is input to the electronic resource planner.

A computer-implementable deployment strategy refers to setting up a network of distributed virtual or physical computerized processing entities exchanging data. Such a computer-implementable deployment strategy is the result of a multi-step process, including planning where in the physical network the computerized processing entities should perform their predetermined operations, as well as the flow paths among computerized processing entities across a physical network. Computer-implementable deployment strategies may be implemented by physical computing devices in an automated fashion. In such systems, the presence of a human is not required, and such systems may theoretically operate without intervention indefinitely.

An electronic resource planner executes Mapping (step 103), Association (step 105), Traffic estimation (step 107) and the condition test (step 117), given reliability and bandwidth and delay requirements and configuration and network topology input. Mapping and Association involve calculating cost functions based on achieved reliability, bandwidth and delay routability indicators. The cost functions are maintained throughout the iterative workflow process by the electronic resource planner. The electronic resource planner develops a computer-implementable deployment strategy based on evaluating the fulfillment of conditions from reliability/bandwidth/delay routability.

Limitations in the Prior Art

The early definition of the control plane in a software-defined network ("SDN") setting assumes that one computerized processing entity (in this context an SDN controller or control instance) handles flow requests over a set of associated electronic aggregators (i.e. SDN switches). To improve reliability and scalability, more recent solutions propose a distributed control plane, consisting of multiple physically distributed but logically centralized control instances. Under distributed conditions, both placement and routing of data traffic between processing entities should be considered to avoid a dramatic increase in communication overhead. The prior art in distributed control plane deployment typically ignores control plane traffic routability (e.g. bandwidth constraint and flow delay limitations) and only considers placement optimized for scalability or reliability.

For example, the prior art in control plane scalability mainly focuses on aspects such as switch-to-computerized processing entity or computerized processing entity-to-computerized processing entity delay reduction, computerized processing entity capacity and utilization optimization, and flow setup time and communication minimization. Prior art examples having reliability models or measurements employ intuitive objective functions to obtain a placement solution, without providing an estimate of the achieved reliability. One prior art solution, for example, proposed a method for estimating the network reliability in polynomial time and provide a lower bound of the actual reliability, along with a heuristic algorithm to decide the number of processing entities and their locations, to guarantee a certain reliability requirement. However, the prior art does not address control traffic routability.

Cloud computing comprises shared pools of configurable computer systems and system resources and higher-level services that can be automatically and rapidly provisioned with minimal management effort, often over the Internet. Cloud computing relies on sharing of resources to achieve coherence and economies of scale, similar to a public utility.

In cloud computing, problems similar to the above-mentioned control plane deployment problem also exist. The placement of virtual machines ("VMs") having an awareness of network resources and inter-VM traffic demands have been studied in the prior art. One prior art solution proposed VM placement approaches with the considerations on the inter-traffic between VMs, by assuming a very simple model of the underlying network (without network topology and routing considerations). In other prior art, methods for placing a fixed number of VMs with traffic consideration based on networks inside a data center have been proposed. For example, one on-demand VM placement solution in the prior art assumes a simple network model which is insufficient in real network applications In the context of elastic network services, a virtual network function can be viewed as a VM with a point-to-point source destination traffic demand. Some prior art focuses on the placement and routing of a given set of VNFs inside a data center. One prior art solution proposes heuristic algorithms for dynamic on-demand placement and routing of VNFs.

Many existing solutions overlook the importance of considering the traffic as part of the solution. Dealing with the traffic associated with certain computer-implementable deployment strategies is typically ignored in the prior art, although traffic flows need to be forwarded timely and reliably through a network infrastructure having varying link capacities, availability, and other networking properties. Traffic congestion, for example, is especially destructive since it may degrade service performance, or worse, cause availability issues—the latter cannot be tolerated in services critical to human safety, for example.

The inventors have discovered that the importance of considering reliability, bandwidth and delay of flows between networking entities (both physical and virtual), factors which have been severely overlooked in the prior art. Dealing with the traffic flows of certain infrastructure deployments is often ignored, although it is essential for most services that the network traffic is forwarded timely through networks exhibiting varying network properties related to service availability and bandwidth.

The inventors have further discovered that at best, the existing state of the art only partially deals with the problem, either by proposing solutions that deal with deployment without the proper consideration of all types of traffic flows, or only deployment without involving certain steps like determining the number of processing entities and data transmission paths. Besides, important aspects related to reliability, bandwidth and flow delay have not been properly modelled and studied until the inventors recognized their importance in developing an improved computerized solution to the problem.

Because of these shortcomings, prior art approaches fail to support reliable service elasticity, albeit being a fundamental feature for scalable network service operation and availability. Not considering reliability, flow delay and bandwidth aspects of the traffic exchanged between entities may consequently lead to serious scalability and service reliability issues in large-scale distributed systems.

It is worth noting that flow delay optimization based on empirical objectives are essentially different from embodiments of the present invention. The present invention is based on well-formulated theory and models, whereas much of the prior art is based on empirical objectives and cannot calculate and guarantee a worst-case flow delay bound.

Formal Problem Definition Associated with Embodiments of the Invention

Assumptions and Requirements

FIG. 01A illustrates an electronic data transmission scheduling system 160, according to an embodiment of the invention that operates with a computerized network 150 having a network topology, exemplified in the context of a distributed control plane. The electronic data transmission scheduling system 160 includes an electronic reliability checker 161, an electronic bandwidth checker 162, and an electronic resource planner 164, according to an embodiment of the invention. Some embodiments of the invention also include an electronic flow delay checker 163. The electronic data transmission scheduling system 160 may comprise one or more computers, a dedicated circuit, a field-programmable gate array (FPGA) and other suitable devices as known to a person of ordinary skill in the relevant field. The electronic data transmission scheduling system 160 may even be combined with other network devices in some embodiments of the invention.

An electronic automated rescheduling system 165, comprising an electronic network monitor 166 and an electronic change detector 167, can be used for initiating the calculation of an updated deployment plan upon changed network conditions of the computerized network 150 (e.g., changed traffic patterns or computerized node or link failures). The electronic power utilization manager 168 controls the energy usage of used and unused computerized data transmission nodes and links. While the electronic power utilization manager 168 is shown as being outside the electronic data transmission scheduling system 160, in some embodiments, the electronic power utilization manager 168 could be constructed inside the electronic data transmission scheduling system 160.

The computerized network 150 will first be described to illustrate the environment in which the electronic data transmission scheduling system 160 operates, according to an embodiment of the invention. The computerized network 150 has a network topology applicable for processing by embodiments of the invention.

The network 150 is the object that the electronic data transmission scheduling system 160 processes, according to an embodiment of the invention. Given a network topology with data transmission nodes and links (as defined herein), the electronic data transmission scheduling system 160 determines which data transmission nodes of 150 contains the processing entities, and which nodes are simply electronic aggregators.

The electronic data transmission scheduling system 160 may operate outside the network 150. The electronic data transmission scheduling system 160 controls, configures, deploys the control plane for the network 150. But, the electronic data transmission scheduling system 160 may typically not be a part of network 150, according to an embodiment of the invention. For example, electronic data transmission scheduling system 160 may operate remotely, or even offline (e.g., just used for booting up the network 150).

So, data transmission nodes (computerized processing entities) 171, 173, together with computer nodes 191-196, comprise a set of data transmission nodes.

Given the sample network 150 in FIG. 01A, by running the electronic resource planner 164, the electronic resource planner 164 determines (for example) the following mapping for the network 150 that it is better to launch processing entities in data transmission nodes 171, 173, in order to receive a desired network mapping reliability score as well as data end-to-end transmission delay. So, electronic resource planner 164 configures the network 150 and makes processing entities launched in data transmission nodes 171, 173. See, e.g., the description of the electronic resource planner 164 with respect to step 109 shown in FIG. 01B, as well as the definition provided for the electronic resource planner 164 hereinbelow.

Notice that mapping means which data transmission nodes are selected and configured to contain the processing entities. The configuration may happen either online or offline, according to an embodiment of the invention After being processed by the electronic resource planner 160, the network 150 comprises a distributed control plane comprising two control planes 181, 183 that each comprise representative electronic aggregators 191-196 but could, of course, include a significantly greater number of electronic aggregators. Each control plane 181, 183 includes data transmission nodes 171, 173. The data transmission nodes 171, 173 comprise computerized devices and/or hardware that handle control traffic within their respective control planes 181, 183. The computer nodes 191-196 correspond to electronic aggregator entities and handle the data traffic in their respective control planes 181, 183.

The solid lines between the elements in the computer network 150 represent data transmission links. The dashed lines represent switch-control traffic, e.g., management instructions from a network manager to a given computerized node. The large solid line connecting the control planes 181, 183 represents control-to-control traffic, e.g., instructions between the two data transmission nodes 171, 173. The collective impact of these control instructions is to make the control planes 181, 183 function collectively as a distributed control plane in the computerized network 150.

The electronic reliability checker 161 examines possible data transmission routes between computerized data transmission nodes involving data transmission nodes 171-173 and computerized nodes 191-196 and the data transmission links to determine network mapping reliability scores for the network topology. The electronic resource planner 164 tests different mappings of processing entities based on reliability scores provided by the reliability checker 161, wherein the reliable data transmission reliability represents a probability that an electronic aggregator 191-196 connects to at least one processing entity 171-173 within a set of data transmission nodes (171, 173) or (193-196) given computerized data transmission node and data transmission link failure probabilities, according to an embodiment of the invention. The electronic reliability checker 161 calculates the measures described herein that pertain to its outputs. The electronic reliability checker 161 may comprise one or more computers, a dedicated circuit, a field-programmable gate array (FPGA) and other suitable devices as known to a person of ordinary skill in the relevant field.

The electronic bandwidth checker 162 calculates a flow routing plan along with the calculated bandwidth allocation per network link for routable solutions (indicated by $\lambda$) following the bandwidth requirements, wherein the electronic bandwidth checker 162 develops calculated bandwidth allocations by testing different combinations of data transmission links and different combinations computerized data transmission nodes 171-173 and 191-196, according to an embodiment of the invention. The electronic bandwidth checker 162 calculates the measures described herein that pertain to its outputs. The electronic bandwidth checker 162 may comprise one or more computers, a dedicated circuit, a field-programmable gate array (FPGA) and other suitable devices as known to a person of ordinary skill in the relevant field.

The electronic resource planner 164 uses the network mapping reliability score from the electronic reliability checker 161, the traffic estimates from the electronic resource planner 164 and the calculated bandwidth allocation from the electronic bandwidth checker 162 to develop a computer-implementable deployment strategy that directs rearrangement of the network topology by calculating a trade-off between the network mapping reliability score and the calculated bandwidth allocation that satisfies predetermined requirements for reliability and the bandwidth, according to an embodiment of the invention. The electronic resource planner 164 calculates the measures described herein that pertain to its outputs. The electronic resource planner 164 may comprise one or more computers, a dedicated circuit, a field-programmable gate array (FPGA) and other suitable devices as known to a person of ordinary skill in the relevant field.

The electronic flow delay checker 163 determines an end-to-end delay of delivering a packet from a sending computerized data transmission node 171-173 and 191-196 to a destination computerized data transmission node 171-173 and 191-196 over at least one data transmission link of a plurality of data transmission links, according to an embodiment of the invention. The electronic flow delay checker 163 will be described in further detail below. The electronic flow delay checker 163 calculates the measures described herein that pertain to its outputs. The electronic flow delay checker 163 may comprise one or more computers, a dedicated circuit, a field-programmable gate array (FPGA) and other suitable devices as known to a person of ordinary skill in the relevant field. For embodiments of the invention including the electronic flow delay checker 163, the electronic resource planner 164 is modified to include the end-to-end delay determination of the electronic flow delay checker along with the outputs of the electronic reliability checker 161, the traffic estimates from the electronic resource planner 164 and the electronic bandwidth checker 162 to develop a computer-implementable deployment strategy that directs rearrangement of the network topology by calculating trade-offs among the network mapping reliability score, the calculated bandwidth allocation, and the calculated end-to-end delay that satisfies predetermined requirements on reliability, bandwidth and end-to-end delay, according to an embodiment of the invention.

The electronic network monitor 166 of the electronic automated rescheduling system 165 is a computerized system that monitors the operational state and performance of the computerized network and the network traffic. The electronic change detector 167 of the electronic automated rescheduling system 166 comprises a computerized system that detects changes in the monitored operational state and performance of the computerized network and network traffic. The electronic change detector can detect changes in end-to-end transmission delays, flow demands, reliability, link or node failures, and/or any other change which influences the reliability and or performance requirements of the deployed control plane. When the electronic change detector 167 detects a change, the electronic rescheduling system 165 signals the electronic data transmission scheduling system 160 to calculate a new control plane deployment strategy, according to an embodiment of the invention.

The electronic power utilization manager 168 is a computerized system that automatically controls the energy usage of data transmission nodes and links. After the electronic data transmission scheduling system 160 has output a computer-implementable deployment strategy, according to an embodiment of the invention, the electronic power utilization manager 168 adjusts the energy levels of computerized data transmission nodes and links. The envisaged effect is that the energy level of computerized data transmission nodes and links is adjusted to the level of utilization, such that, e.g., unused links and nodes are powered off completely or operating at lower power levels.

As shown in FIG. 01A, $G(V=T \cup M, E)$ can be used to represent a graph of the computerized network topology 150, where V and E denote computerized data transmission nodes 191-194 and 171-173 and data transmission links between the computerized data transmission nodes 191-194 and 171-173, respectively. T denotes the set of nodes holding electronic aggregators and M represents a candidate set of nodes eligible for hosting a computerized processing entity. N⊆T denotes the set of electronic aggregators that needs to be associated to a computerized processing entity. Further, let each node n∈V have a given probability of being operational, denoted by $p_n$. Analogously, data transmission links (u,v)∈E are operational with probability $p_{u,v}$. Assume different Independent and Identically Distributed ("i.i.d.") operational probabilities for network links and nodes. Note, that this probability can be predetermined based on expert knowledge or inferred by learning about the system performance over time.

A variety of methods may be employed for calculating the delay bound. For example, some embodiments of the invention may employ Network Calculus ("NC") while other embodiments of the invention may employ queuing theory for calculating a stochastic delay bound. The examples herein employ NC, but the ordinary artisan will be aware that other techniques may be employed to calculate the delay bound. Network Calculus ("NC") may be applied for calculating the worst-case delay and buffer space requirements of flows in a network, according to an embodiment of the invention. "NC", a system theory for communication networks, is further described below in connection with FIG. 5. To apply NC, estimation $(b_f, d_f)$ of the arrival curve of each flow f is required, where $b_f$ denotes the burstiness, and $d_f$ is the sustainable arrival rate (throughput). Besides, the computerized system also computes the Equivalent Service Curve ("ESC") $\gamma_f = (r_f, T_f)$ offered by the network for the flow f, where $r_f$ is the service rate and $T_f$ is the maximum service delay. With arrival curve and ESC, the computerized system can then derive the delay bound $D_f$ and buffer bound $B_f$ of flow f.

To forward traffic with bounded delay, each node employs a certain guaranteed performance service discipline to schedule flows that require the same output link. For example, suppose the bandwidth and propagation delay of an output link e is $(u_e, t_e)$, and the reserved and guaranteed service rate of a flow is $r_e$, $r_e \leq u_e$. Then, if the electronic data transmission scheduling system 160 employs the Weighted Fair Queuing ("WFQ") discipline, the service curve for the flow is $\gamma_f^e = (r_e, L_{max}/r_e + L_{max}/u_e)$, where $L_{max}$ is the maximum packet size, $r_e$ is the service rate, $L_{max}/r_e + L_{max}/u_e$ is the maximum service delay. Suppose the flow has an arrival curve of $(b_f, d_f)$, according to NC, the delay bound of the flow for traversing the link is $D_f^e = L_{max}/r_e + L_{max}/u_e + t_e + b_f/r_e$, and the backlog bond $B_f^e = b_f + (L_{max}/r_e + L_{max}/u_e) d_f$. If the electronic data transmission scheduling system 160 employs the Self-Clocked Fair Queueing ("SCFQ") discipline, the service curve is $\gamma_f^e = (r_e, L_{max}/r_e + \Sigma_{m \neq f} L_{max}/u_e)$, where m denotes all the flows to the scheduler, f denotes the target flow. The ordinary artisan may find additional references for more guaranteed performance service disciplines and their corresponding service curves.

Formal Problem Solved by Embodiments of the Invention

The electronic reliability checker 161 shown in FIG. 01A determines the network mapping reliability score as follows, according to an embodiment of the invention. Let binary variables $y_i$ denote the computerized processing entity locations, where $y_i=1$ if node i∈M hosts a computerized processing entity, and $y_i=0$ otherwise. Define C={i|$y_i$=1, i∈M} to denote the set of deployed computerized processing entities. Let binary variable $a_{ij}=1$ if electronic aggregator j∈N is associated with the computerized processing entity in i∈C, otherwise $a_{ij}=0$. Although each electronic aggregator j can only be associated with one computerized processing entity at a time, it may have multiple backup computerized processing entities (e.g., in the case of processing entities with Openflow V1.2 protocol). The distance between an electronic aggregator j and a computerized processing entity can be one network link hop or multiple hops. The reliability of node j is represented as R(G, j, C) (among |C| computerized processing entities), capturing the probability of node j connecting with at least one of the operational computerized processing entities. Solutions satisfying the constraints given topological conditions and reliability threshold β are found by R min=min(R(G, j, C), ∀j∈N)>β.

The electronic bandwidth checker 162 shown in FIG. 01A calculates the bandwidth allocations for the network topology as follows, according to an embodiment of the invention. Let $(u_e, t_e)$ represent the bandwidth capacity and propagation delay of each data transmission link e∈E. Let $\Gamma = (u_e, t_e); \forall_e \in E$. Suppose $(s_f, t_f)$ being the (source, sink) of traffic flow f. Let $(b_f, d_f)$ denote the burstiness and demand (throughput) of f. Let F={f=$(s_f, t_f, (b_f, d_f))$} be the set of all the traffic of the deployed infrastructure. Let $F_c \subset F$ be the inter-traffic of computerized processing entities that $F_c$={f= $(s_f, t_f, (b_f, d_f))|s_f \in C, t_f \in C$}. Let $\kappa_f$ denote all the possible non-loop paths for f∈F, and let $\kappa = \cup_f \kappa_f$. Let binary decision variable $\delta^{(K)}$, ∀K∈κ to denote whether path K is selected and used for the flow routing. Let variable X(K) denote the reserved guaranteed service rate for the flow f along path K, ∀K∈κ. There will be a sub-flow on path K if and only if $\delta^{(K)}=1$ and X(k)>0. Let $X_f = \{X(K)|K \in \kappa_f\}$ denote the reserved guaranteed service rates on all the paths of f. Let $D_{max}$ denote the delay bound constraint, and $B_{max}$ denote the backlog bound constraint. The electronic resource planner 164 shown in FIG. 01A may also compute some of the equations above as well, according to an embodiment of the invention.

The electronic flow delay checker 163 shown in FIG. 01A may calculate the delay bound of a flow described as follows, according to an embodiment of the invention. Embodiments of the invention assume a flow f can be split and routed on a list of selected paths $\kappa'_f = \{K|\delta^{(K)}=1, K \in \kappa_f\}$, with each path route a sub-flow $f^{(K)}$, K∈$\kappa'_f$. Thus, to calculate the delay bound $D_f$ and buffer bound $B_f$ of a flow f, a computerized method and system needs to calculate the delay and backlog bounds of sub-flow $f^{(K)}$, which are denoted as $D_f^{(K)}$ and $B_f^{(K)}$, respectively, since one has $D_f$=max $\{D_f^{(K)}\}$ and $B_f$=max $\{B_f^{(K)}\}$. Embodiments of the invention use $(b_f^{(K)}, d_f^{(K)})$ in computerized methods and methods to denote the burstiness and arrival rate (throughput) of the sub-flow $f^{(K)}$. The burstiness of each sub-flow should be less than or equal to the burstiness of the aggregated flow f, according to an embodiment of the invention. Considering the worst case, the computerized method and system can assume $b_f^{(K)} = b_f$, ∀K∈$\kappa_f$, according to an embodiment of the invention. The computed summation of the arrival rates of all the sub-flows should equal to that of the aggregated flow, which means $\Sigma K \in \kappa'_f d_f^{(K)} = d_f$.

For each sub-flow $f^{(K)}$, given X(K) and the output link bandwidth and flow delay $(u_e, t_e)$ at data transmission link e along the path, by applying Network Calculus ("NC") and the corresponding service discipline, embodiments of the invention in the form of computerized methods and systems calculate the flow $f^{(K)}$'s service curve at data transmission link e as $\delta^B_f(K) = (X(K), T_e)$. Suppose the path of $f^{(K)}$ have k nodes, then computerized methods and systems may calculate the total ESC of path K as $\delta_{f(K)} = (X(K), ts_f^{(K)}) = \delta^{e1}_f{}^{(K)} \otimes \delta^{e2} f^{(K)} \ldots \delta^{e1}_f{}^{(K)}$, e1 ... ek∈K, by applying the concatenation property of NC. Here ⊗ denotes the min-plus convolution operation in NC. Then, by applying NC, embodiments of the invention derive the delay bound of each sub-flow as $D_f^{(K)} = ts_f^{(K)} + b_f^{(K)}/X(K) + \Sigma_{e \in K} t_e$ and $B_f^{(K)} = b_f^{(K)} + ts_f^{(K)} d_f^{(K)}$, where $ts_f^{(K)}$ is the service latency and which depends on the used service discipline (e.g., Weighted Fair Queueing). The delay bounded deployment problem requires that for all non-zero sub-flows $$D_f^{(K)} < D_{max}, B_f^{(K)} < B_{max}, \forall K \in \kappa_f, \forall f \in F.$$

Using the above method, then embodiments of the invention operating as computerized systems formulate the problem to be solved by computerized methods and systems as follows:

maximize 0 s.t.: $\sum_{i \in C} a_{ij} = 1, \forall j \in N$ (1)

$\sum_{i \in M} y_i \geq 1$ (2)

$R(G, j, C) \geq \beta, \forall j \in N$ (3)

$y_i, a_{ij} \in \{0, 1\}$ (4)

$\sum_{K \in \kappa_f} X(K)\delta^{(K)} \geq d_f, \forall f \in F$ (5)

$\sum_{K:e \ni K} X(K)\delta^{(K)} \leq u_e, \forall e \in E$ (6)

$X(K) \geq 0, \forall K \in \kappa$ (7)

$\sum_{K \in \kappa_f} d_f^{(K)} = d_f, \forall f \in F$ (8)

$\delta^{(K)}(ts_j^{(K)} X(K) + b_f^{(K)}) \leq \left(D_{max} - \sum_{r \in K} t_e\right) X(K),$ (9)

$\forall K \in \kappa_f \forall f \in F$ $\delta^{(K)}(b_f^{(K)} + ts_f^{(K)} * d_f^{(K)}) \leq B_{max}, \forall K \in \kappa_f, \forall f \in F$ (10)

$d_f^{(K)} \leq X(K)\delta^{(K)}, \forall K \in \kappa_f, \forall f \in F$ (11)

$d_f^{(K)} \geq 0, \forall K \in \kappa_f, \forall f \in F$ (12)

$\delta^{(K)} \in \{0, 1\}, \forall K \in \kappa$ (13)

The electronic bandwidth checker 162 shown in FIG. 01A may be configured to execute equations (5), (6), and (7), according to some embodiments of the invention.

Processing components and workflow for embodiments of the invention.

Embodiments of the invention constructed as computerized methods and systems may solve two problems that arise during deployment: 1) determining the number of computerized processing entities, their location and relative connectivity; and, 2) information flow configuration across the infrastructure of deployed computerized processing entities relative to specific performance requirements on bandwidth, flow delay and reliability.

FIG. 01B illustrates a solution to the problems described above obtained in a series of interlinked, iterative optimization steps carried out in line with the computerized workflow 100, according to an embodiment of the invention. The computerized workflow 100 is suitable for implementation in computerized systems, according to an embodiment of the invention. In particular, the computerized workflow 100 is suitable for implementation via the architecture described in FIG. 01A, according to an embodiment of the invention.

The electronic resource planner 164 performs an initial configuration and input (Step 101) that comprises specifying a network topology and its networking properties for a large computerized system such as the computerized system 150 shown in FIG. 01A. The electronic resource planner 164 also inputs operator-specified constraints on the service to be deployed with respect to bandwidth, flow delay and reliability, according to an embodiment of the invention.

The electronic resource planner 164 next performs a mapping (Step 103) of the computerized processing entities in a large network, such as the computerized system 150 shown in FIG. 01A, given the configuration of and inputs to the large network, according to an embodiment of the invention. The electronic resource planner 164 outputs from Step 103 a computer-readable processing entity location map, according to an embodiment of the invention.

The electronic resource planner 164 next performs an association (Step 105) which defines the connectivity among computerized processing entities and electronic aggregators in the computerized system 150 shown in FIG. 01A. The electronic resource planner 164 outputs a computer-readable association plan, according to an embodiment of the invention.

The electronic resource planner 164 next performs a traffic estimation (Step 107) that computes the demand and burstiness of each flow according to the input association plan given a network-operator specified traffic model for the computerized system 150 shown in FIG. 01A, according to an embodiment of the invention.

The electronic bandwidth checker 162 next performs a routability check (step 109) that includes bandwidth verification (step 110) and may optionally include delay and backlog bound verification (step 111), according to an embodiment of the invention. The combined "bandwidth routability verification" (Steps 109/110) tests whether all flows can be routed without overloading any data transmission link relative to specified bandwidth constraints. The inputs to Steps 109/110 are the set of network topology properties and the estimated flow demand and burstiness previously calculated by the electronic resource planner 164 in the traffic estimation step 107. The output is a routability indicator λ. If (λ≥1) a flow routing plan can be retrieved from the bandwidth checker 162. When the bandwidth checker 162 has performed the bandwidth verification steps 109/110, operations may move to the next step 111. Note: executing step 111 is optional and only required if flow delays are to be accounted for in the deployment plan. If step 111 is not executed, the electronic resource planner will assess the conditions in step 117.

The electronic flow delay checker 163 performs a delay and backlog verification (step 111) that tests whether the estimated flows can be routed under given flow delay and buffer space requirements under the conditions defined by the deployment plan. The electronic flow delay checker 163 also calculates delay and backlog bounds based on the input from the traffic estimates previously calculated in the Traffic Estimation step 107 in the electronic resource planner. If the routability indicator from the previous step 110 in the electronic bandwidth checker is λ<1, then the routability indicator χ will be initialized to χ=λ, meaning that the step 111 will not be executed, and the operation move on to step 117. Otherwise, step 111 will be executed and the output of the electronic flow delay checker 163 will be the calculated routing indicator $\chi$ and a flow routing plan, followed by executing the step 117.

In the condition step 117 executed in the electronic resource planner 164, the electronic resource planner 164 determines whether the estimated flows are routable by inspecting a routability indicator. If routable, the electronic resource planner 164 outputs a computer-implementable deployment strategy that meets all requirements. If the electronic resource planner 164 determines that the estimated flows are not routable by inspection of a routability indicator, and the end-conditions are met (i.e. number of maximum iterations), the electronic resource planner 164 will output a null-deployment strategy (a form of computer-implementable deployment strategy), meaning that no satisfactory solution was found. Otherwise, the electronic resource planner 164 performs the association step (step 105) or the mapping step (step 103), according to an embodiment of the invention. The order for signaling the redoMapping (113) or redoAssociation (115) and the number of iterations for re-running step 103 and step 105 can be flexibly defined in an embodiment of the invention.

In various embodiments of the invention, the electronic resource planner 164 may flexibly specify the end-conditions. For example, the electronic resource planner may end the computerized method illustrated in FIG. 01B after a maximum number of iterations, or when all the routability and reliability requirements have been fulfilled. In case the identification of a feasible computer-implementable deployment strategy fails before the end-conditions are met, the electronic resource planner 164 has the following options:

change or redefine the topological properties, or
check the feasibility of the requirements on bandwidth, flow delay or reliability.

Embodiments of the invention may also employ the second option for optimization purposes, since computerized tools may fix two requirements of the three and optimize the remaining one using binary search. For example, embodiments of the invention can fix the flow delay and reliability requirements, and search for the minimum bandwidth needed to satisfy the flow delay and reliability requirements.

Some Practical Considerations

The computerized workflow 100 may be formally expressed mathematically in terms of a feasibility problem, according to an embodiment of the invention. The underlying routing mechanisms of the computerized infrastructure influence the formulation of the problem—if flows cannot be split and routed, then an additional constraint need to be added on the decision variables $\delta^{(K)}$, e.g. $\Sigma_{K \in \kappa_f} \delta^{(K)} = 1$, $\forall f \in F$. Computerized systems, such as the computerized system 150 shown in FIG. 01A and mapped in FIG. 2, may be implemented in accordance with available computational resources and operational requirements, according to an embodiment of the invention.

Suitable computing equipment and methods, such as machine learning algorithms for graph problems using distributed computing platforms can process the computerized workflow 100, according to an embodiment of the invention.

One exemplary implementation of the computerized workflow 100 is provided below. For applying the exemplary computerized workflow 100 for deploying the control plane for Software Defined Networks, the computerized processing entities are network controllers. According to the mechanisms of the infrastructure, there are two ways to organize the control plane, which are in-band control and out-of-band control.

With out-of-band control all the computerized processing entities communicate with each other using dedicated networks (e.g., dedicated networks running in remote clouds), according to an embodiment of the invention. In contrast with in-band control, both computerized processing entity and electronic aggregator traffic share the same network. Embodiments of the computerized workflow 100 may be configured to support both cases, although the out-of-band case may additionally require that the paths for the inter-processing entity traffic $F_c$ should be limited within the computerized control network. This limitation has already been implicitly included in the definition of the set $\kappa_f$. The $\kappa_f$ is defined as the set of all the possible paths for a certain flow f. A possible path for flow $f \in F_c$ in the out-of-band case can only be selected among data transmission links belonging to the control network.

Differences to the Known Prior Art

Some prior art comprises a heuristic computerized processing entity placement method but provides no considerations regarding control plane routability and reliability.

Other prior art focuses on the placement of SDN switches, rather than processing entities. Moreover, this prior art only tries to place a minimum number of SDN-enabled switches in a hybrid SDN network to achieve 100% single-link failure coverage. This prior art does not consider flow demands and link capacity constraints.

Still other prior art proposes a network controller placement and electronic aggregator association method configured to avoid single link/node failure, without the control plane traffic routability check and delay and backlog check steps.

Some other prior art describes a method for placing SDN controllers in a way that the delay may be optimized. Nevertheless, this prior art also does not take control plane traffic routability issue into consideration when doing the placement.

Still other prior art comprises allocating computing and network resource for a given number of VMs. However, this method does not have proper network flow delay estimations.

Finally, some prior art comprises a method for allocating processing entities to electronic aggregators. This prior art is similar to the association step 105 shown in FIG. 01B, but this prior art has neither a routability check step nor placement step.

To summarize, the prior art differs from embodiments of the present invention in mainly two ways: 1) the prior art solves the placement problem with methods significantly different from the invention; and 2) the prior art does not consider and address the reliability, bandwidth and flow delay aspects of a computer-implementable deployment strategy properly.

Advantages and Applications

The most prominent feature of various embodiments of the invention is that can solve problems relevant to several practical applications in large distributed computing systems. Hence, embodiments of the invention are widely applicable to automated resource management problems requiring guaranteed performance and reliability of information flows.

Examples of applications that benefit from embodiments of the invention are many and include:

Distributed big data computations, where resource allocation and synchronization of partial results require data transactions under certain performance requirements and reliability guarantees.

Deployment of logically centralized control planes in Software-Defined Networks, where data transactions for synchronized information updates need to be carried out in line with specified performance requirements and reliability guarantees to maintain information consistency and service availability.

Self-organization of wired and wireless communication infrastructures (e.g. sensor networks) requiring multiple cluster heads selection and association of nodes and flows following performance and reliability requirements.

Scaling of virtualized network ("VN") functions implementing elastic services, which require performance and reliability guarantees of deployed flows to ensure service availability and quality.

Organization of wireless access networks, associating access points and base stations as electronic aggregators with distributed computerized processing entity instances (computerized processing entities) as part of a distributed evolved packet core.

Cell association of wireless equipment (electronic aggregators) to dynamically deployed virtual access points or base stations (computerized processing entities), allowing for turning on and off access infrastructure relative to, e.g., changing user concentration, service usage intensity or energy efficiency requirements (note: this assumes fixed or close to fixed location of transceivers).

Embodiments of the invention not only provide computerized systems that calculate the worst-case delay, but also provide computerized systems based on mathematical models and theories that effectively guarantee that the affected data flow transmissions in the computerized network will not exceed such calculated worst-case delay.

Thus, embodiments of the invention may be considered to offer guarantees. In contrast, others in the prior art claims to delay reduction are only based on experience or experimental observations and cannot provide any theoretical guarantees. The prior art is not known to offer delay guarantees for all flows in the network.

Second, the delay in most queuing systems mainly comprises: queuing delay and propagation delay. The prior art only considers the propagation delay but not queuing delay.

Third, the proposed workflow has the delay and backlog check step together with the other four steps in one iterative process. It is not typically a good idea to running them separately, e.g., running a main iteration with the other four steps to determine mapping and association, and then running a separate iteration which only contains has the delay and backlog step to schedule flow paths to meet the worst-case flow delay constraints. This is due to that in order to find a flow scheduling that meets the worst-case delay constraints, the optimization procedure may have to alter the mapping and association plans. This is a complicated and non-trivial iterative optimization process.

Embodiments of the invention may be applied to problems of the same class independently of the specific properties of the underlying computerized network topology and networking conditions, allowing the system operator to specify traffic models, topological properties and end-conditions arbitrarily for execution by the computerized system. Furthermore, each step of the computerized workflow 100 shown in FIG. 01B enables a flexible implementation based on any suitable computerized method of choice (heuristic methods, machine learning, exhaustive search, etc.) and is hence adaptive to the computerized system at hand, in terms of computational capacity, platforms and software.

Moreover, embodiments of the invention offer flexible usage as an offline tool for analyzing and quantifying the effects of computer-implementable deployment strategies in a networked system, or as an integrated online process in a system implementing automated resource management. For example, embodiments of the invention can be used as a tool by a network operator to analyze and plan different computer-implementable deployment strategies fitted to different service availability scenarios with different requirements on reliability, bandwidth and end-to-end delay (see, FIG. 03 and FIG. 04). As an online process, embodiments of the invention may be integrated in computerized systems implementing service elasticity.

An application example of the computerized workflow 100 shown in FIG. 01B may comprise a distributed control plane deployment in SDN, according to an embodiment of the invention. This example demonstrates the applicability of embodiments of the invention to the distributed control plane deployment problem, which here encompasses computerized processing entity placement and associated control traffic of a distributed control plane that appears logically centralized. In this context, a computerized processing entity such as 173 in FIG. 01A corresponds to an SDN controller (or control instance), whereas an electronic aggregator corresponds to a network switch, such as 192 in FIG. 01A. The objective of the computerized workflow 100 here is to produce a computer-implementable deployment plan that identifies: (1) the control service infrastructure of processing entities (control instances); (2) the associated electronic aggregator connections; and, (3) the traffic flows relative to specified reliability, bandwidth and flow delay requirements.

This example presents three major challenges. First, the control instances should preferably be placed in a manner that satisfies the given constraints on reliability. This includes decisions on how many control instances to use, where to place them and how to define their control regions. The computerized processing entity (SDN controller) placement problem in general is NP-hard. Second, the computerized system must verify that the control traffic introduced by a placement solution can be scheduled on the underlying network without overloading any network link. Third, the computerized system as the electronic data transmission scheduling system in 160 must verify the control traffic flows can be routed in way that the required delay and backlog bounds are held.

To solve the first problem, the prior art offers a general resort to heuristics to reduce the search space as the computerized processing entity placement problem in general is NP-hard. The second problem can be modelled as a multi-commodity flow problem for the verification of the routability. The third problem is a Mixed Integer Programming ("MIP") problem, which is NP-complete. This kind of problem may be generally solved by employing random search algorithms.

The following subsections illustrate how each step of an embodiment of the computerized workflow 100 shown in FIG. 01B may be applied to solve the distributed control plane deployment problem.

Details of the computerized workflow 100 used in this example

Recall, that embodiments of the invention operate in a workflow comprising six steps, as shown in FIG. 01B. The following subsections outline each step in detail with respect to the control plane deployment problem.

Mapping (Step 103) as Employed in this Example

The generality of the optimization process allows for a black-box implementation, expressed in this example using Simulated Annealing for Mapping ("SAM"). In short, the computer-implementable SAM algorithm (for a computer-implementable deployment strategy) executed in electronic resource planner 164 follows the standard simulated annealing template, except that the SAM algorithm generates a new solution and decreases the temperature T when receiving the redoMapping signal. A computerized method and system for generating a new solution is designed as randomly adding or removing a computerized processing entity based on the current mapping solution.

In some embodiments of the invention, the electronic resource planner 164 may calculate computer-implementable cost (energy) function for evaluating a mapping with respect only to bandwidth routability may be defined as:

$$\text{cost} = \min\left(0, \log_{10} \frac{1 - R_{min}}{1 - \beta}, \lambda - 1\right)$$

In other embodiments of the invention, the electronic resource planner 164 may calculate the computer-implementable cost (energy) function for evaluating a mapping with respect to bandwidth and flow delay routability may be defined as:

$$\text{cost} = \min\left(0, \log_{10} \frac{1 - R_{min}}{1 - \beta}, \chi - 1\right)$$

The electronic bandwidth checker 162 shown in FIG. 01A may calculate $\lambda$ in the bandwidth verification (step 110), according to an embodiment of the invention. $\lambda$ indicates whether control traffic is routable ($\lambda \leq 1$) under bandwidth and reliability constraints or not ($\lambda < 1$). When bandwidth and reliability constraints are satisfied, the cost function calculated in the electronic resource planner 164 reaches its maximum value 0.

The electronic flow delay checker 163 shown in FIG. 01A may calculate $\chi$ in the delay and backlog bound verification step (step 111), according to an embodiment of the invention. $\chi$ indicates whether control traffic is routable ($\chi \geq 1$) under the delay and backlog constraints or not ($\chi < 1$). When delay, backlog and reliability constraints are satisfied, the cost function calculated in the electronic resource planner 164 reaches its maximum value 0.

Since directly computing the reliability R(G, j, C) is NP-hard, the computerized approximation method and system in this example is applied for computing instead a lower bound:

$$\overleftarrow{R(G, j, C)}$$

The electronic reliability checker 161 shown in FIG. 01A may be configured to perform the computations immediately above, according to an embodiment of the invention. An algorithm example is provided below, where the transition probability function P defines the probability with which a new mapping will be accepted and a computer function (getNextSolution function in Algorithm 1) generates a new mapping by randomly adding, removing or moving a control instance based on the previous mapping:

---

Algorithm 1 The simulated annealing algorithm for mapping

Input control signal: RedoMapping with inputs C, $\text{cost}_{new}$
    Initialization
1:    Choose a set C of controllers from the set V
2:    Calculate Rmin = min($\overleftarrow{R(G,j,C)}$), $\forall j \in V$
3:    $C_{current}$ = C, T = $T_{Initial}$
4:    Output $R_{min}$, C
5:    Upon control signal < RedoMapping|C, $\text{cost}_{new}$ > do
6:      if T == $T_{Initial}$ then
7:        $\text{cost}_{old}$ = $\text{cost}_{new}$
8:      else if P($\text{cost}_{old}$ = $\text{cost}_{new}$, T) ≥ random(0, 1) then
9:        $C_{current}$ = C
10:    end if
11:    C = getNextSolution($C_{current}$),
12:    Calculate Rmin = min($\overleftarrow{R(G,j,C)}$), $\forall j \in V$
13:    T = $\gamma$T
14:    Output Rmin, C
15:    end upon

---

The electronic reliability checker 161 employs a computerized approximation method to first compute the set of the disjoint paths from an electronic aggregator j to all the processing entities C, noted as $\kappa^j$. Given the i.i.d operational probability of links/nodes on each disjoint path, this computerized method calculates the failure probability of each path, noted as $F_k$, $k \in \kappa^j$. Then, the electronic reliability checker 161 computes the:

$$\overleftarrow{R(G, j, C)} = 1 - \Pi_{k \in \kappa^j} F_k$$

Association (Step 105)

The electronic resource planner 164 employs a computerized algorithm the performs simulated annealing for association (SAA) and is similar to SAM, according to an embodiment of the invention. One difference relates to the cost function cost=min(0, $\lambda$−1) (or cost=min(0, $\chi$−1)) maintained by the electronic resource planner 164. The other difference is that the electronic resource planner 164 may also generate a new solution by a random association of electronic aggregators and processing entities towards obtaining a satisfying solution. This procedure (getNextSolution for association) is exemplified in the algorithm description below by the computer function in Algorithm 2 (getNextSolution for association). The association step is executed after the Mapping step (step 103) or upon receiving the redoAssociation signal.

---

Algorithm 2 Procedure of getNextSolution( ) for association

Input control signal: The set of controllers C, Current association $\{a_{i,j}|i \in C, j \in N\}$. Number of hops between any pair of nodes dist(i, j), $i \in N$, $j \in N$. Let A(c) denotes the aggregators associated to controller c.
1:    procedure GETNEXTSOLUTION(C, $\{a_{i,j}|i \in C, j \in N\}$)
2:      Randomly select an controller $i \in C$, that satisfies rest = N − A(i) − C ≠ 0, where rest denotes the aggregators not associated to i.
3:      Compute minDist = $\min_{j \in rest}$ dist(i, j).
4:      while True do
5:        Randomly select an aggregator $j \in$ rest
6:        distInv = 1/dist(i, j) − minDist + 1)
7:        if distInv ≥ random(0, 1) then
8:          Get the current controller i' of j.
9:          Assign $a_{i',j}$ = 0, assign $a_{i,j}$ = 1.
10:         return $\{a_{i,j}|i \in C, j \in N\}$
11:        end if
12:      end while
13:    end procedure Traffic Estimation (Step 107)

The electronic resource planner 164 estimates the bandwidth demands of electronic aggregator-processing entity and processing entity-processing entity flows, according to an embodiment of the invention. Let ($s_f$, $t_f$, $d_f$, $b_f$) represent the source, sink, demand and burstiness of a flow f respectively. The objective of the electronic resource planner 164 here in this Traffic Estimation step is to estimate each ($d_f$, $b_f$) while $s_f$ and $t_f$ are known from the mapping (step 103) and association steps (step 105). The result of the Traffic Estimation step is used as input for the routability check step 109, involving the bandwidth verification step 110 and possibly the delay and backlog verification step 111.

Since the optimization process performed by the electronic resource planner 164 process treats the model of control traffic as an input variable, embodiments of the invention may employ any known computerized traffic model for estimating each ($d_f$, $b_f$). For example, embodiments of the invention can perform the modeling with either a simple linear modelling method or advanced machine learning techniques.

Here is a simple traffic estimation model suitable for the electronic resource planner 164, associated with an embodiment of the invention. First, for computerized demand estimation assume that the message sizes of electronic aggregator request and corresponding computerized processing entity response are $T_{req}$=128 and $T_{res}$=128 bytes, respectively. Furthermore, after dealing with a request, the computerized processing entity instance sends messages of size $T_{state}$=500 bytes to each of the other $|C|-1$ control instances notifying about the network state changes. Note that, the computerized traffic model here is essentially in line with the ONOS traffic model. The electronic resource planner 164 sets message sizes according to various parameters known to an ordinary artisan but can also be set arbitrarily. With these parameter settings and given the request rate $r_j$, $j \in N$ of each electronic aggregator, embodiments of the invention can simply estimate the flow demand between electronic aggregator j and its associated computerized processing entity is $r_j T_{req}$ and $r_j T_{res}$, for electronic aggregator-processing entity direction and processing entity-electronic aggregator direction, respectively. A computerized simple linear model may estimate the outgoing inter-control flow demand from computerized processing entity i to another computerized processing entity, which is described as $T_{res} \Sigma_{j \in N} a_{ij} r_j$. Second, the computerized methods employed here may estimate the burstiness of a flow f as $b_{ratio} d_f$, where $b_r$ is a burstiness ratio. We assume the burstiness of a flow is proportional to its demand.

Bandwidth Verification (Step 110)

The electronic bandwidth checker 162 shown in FIG. 01A computerized step checks whether all flows can be routed without overloading any data transmission link relative to specified bandwidth constraints, with all the possible paths. As discussed, the electronic bandwidth checker 162 calculates the routability indicator $\lambda$ (executing the est$\lambda$ and FPTAS algorithms). Thus, computerized implementations of this step assume $\delta^{(K)}=1$, $\forall K \in \kappa$ and checks whether constraints (5), (6), (7) (provided above) can hold, which may be solved using a computerized linear programming (LP) method. However, solving this routability problem using computerized methods still means dealing with an undesired large number of variables X(K), which scales up exponentially with the number of vertexes and edges with a graph. This issue can be circumvented by formulating in a computer a maximum concurrent flow problem (as (15), (16), (17), (18) suggest below), which is easier to solve and equivalent to the multi-commodity flow problem.

The electronic bandwidth checker 162 shown in FIG. 01A may calculate maximum concurrent flow in the network, according to an embodiment of the invention. The fundamental idea of the maximum concurrent flow problem is to keep the capacities of the data transmission link fixed while scaling the injected traffic so that all flows fit in the network. The optimization objective $\lambda$ reflects the ratio of the traffic that can be routed over the current injected traffic. If the computerized methods obtain $\lambda \geq 1$, the current traffic is routable, and all data transmission link utilizations are less than one. The computerized interpretation is that more traffic variation can be tolerated with check larger $\lambda$.

$$\text{maximize } \lambda \tag{15}$$

$$\text{s.t.: } \sum_{K:\varepsilon \ni K} X(K) \leq u_e, \forall e \in E \tag{16}$$

$$\sum_{K \in \kappa_f} X(K) \geq \lambda d_f, \forall f \in F \tag{17}$$

$$X(K) \geq 0, \forall K \tag{18}$$

The dual of the above maximum concurrent flow problem, as specified in (19)-(20) below, where $l_e, z_f$ are the dual variables of edge constraints (16) and flow constraints (17), respectively, has a linear number of variables and an exponential number of constraints, according to an embodiment of the invention. This approach allows for a computerized solution to the problem to a desired level of accuracy using a primal-dual algorithm. A computerized method can perform the primal-dual algorithm based on Fully Polynomial Time Approximation Schemes (FPTAS). An embodiment of the invention may implement e.g. the "Fast Approximation Scheme" (FAS) algorithm by Karakostas [GKA08] as a computerized algorithm, in which case the computerized method can obtain the near-optimal $\lambda$, which is guaranteed within the $(1+\varepsilon)$ factor of the optimal, within the time complexity of $O(\varepsilon^2 |E|^2 \log^{O(1)} |E|)$. The Karakostas [GKA08] FAS algorithm is further detailed in "Faster approximation schemes for fractional multicommodity flow problems," Transactions on Algorithms (TALC), vol. 4, no. 1, p. 13, 2008, which is incorporated fully herein by reference.

$$\text{minimize } D(l) = \sum_{c \in E} u_c l_c \tag{19}$$

$$\text{s.t.: } \sum_{c \in K} l_c \geq z_f, \forall f \in F, \forall K \in \kappa_f \tag{20}$$

$$\sum_{f \in F} d_f z_f \geq 1. \tag{21}$$

$$l_c \geq 0, \forall e \in E \tag{22}$$

$$z_f \geq 0, \forall f \in F \tag{23}$$

Another embodiment of the invention used for control plane deployment (or similar problems) may implement a faster variant of FAS based on FPTAS by only iterating the computation through controller nodes rather than through all nodes. This significantly reduces the total number of iterative steps and, hence, the computational complexity as the number of controllers are substantially fewer than the number of nodes in a computerized network. An example algorithm of FPTAS is outline below.

---
Algorithm 3 The FPTAS algorithm for computing $\lambda$

1:    $D(l) \leftarrow 0$
2:    $l(e) \leftarrow \delta/u_e$
3:    $R_f \leftarrow 0, \forall(s_f, l_f)$
4:    while $D(l) < 1$ do     ▷ phase loop
5:       for each node $c \in C$ do     ▷ iteration loop
6:          $d'(f) = d_f \forall f \in F^c$
7:          while $D(l) < 1$ and $d'(f) > 0$ for some $f \in F^c$
        do     ▷ step loop
8:            $P_f^c$: Shortest path using $l$ as link weights, $\forall f \in F^c$ with $d'(f) > 0$
9:            $\rho(e) = \Sigma_{f:e \in P_f} d'(f)/u_c$ is the utilization of $e \in E$.
10:          $\sigma = \max(1, \max_{e \in \cup_f P_f^c} \rho(e))$
11:          Route $d_r(f) = d'(f)/\sigma$ amount flow along $P_f^c$, $\forall f \in F^c$ with $d'(f) > 0$
12:          $d'(f) = d'(f) - d_r(f), \forall f \in F^c$
13:          $R_f = R_f + d_r(f), \forall f \in F^c$ 14:
$$l(e) = l(e)\left(1 + \epsilon\left(\sum_{f:e \in \in P_f} \frac{d_r(f)}{u_c}\right)\right),$$
$\{|\forall f \in F^c\}$ 15:          Compute $D(l) = \Sigma_{e \in E} u_e l(e)$
16:       end while
17:       end for
18:    end while 19:
$$R_f = R_f / \log_{1+\epsilon} \frac{1+\epsilon}{\delta}, \forall f \in F$$

20:    $\lambda = \min_{\forall f \in F}(R_f/d_f)$
Output: $\lambda$

---

The computerized bandwidth verification step (step 110) will ultimately output the optimal value of $\lambda$ and the corresponding solution $\{X^*(K)\}$.

In an embodiment of the invention, the electronic bandwidth checker 162 shown in FIG. 01A calculations for the bandwidth verification step (step 110 shown in FIG. 01B) can be accelerated by implementing the computerized algorithm est$\lambda$ in the electronic bandwidth checker 162 that assesses if $\lambda \geq 1$. Such a computerized algorithm calculates $\lambda_{low}$ and $\lambda_{high}$. If both $\lambda_{low} > 1$ and $\lambda_{high} < 1$, then a computerized FPTAS based algorithm may be executed to calculate $\lambda$. Otherwise, $\lambda = (\lambda_{low} + \lambda_{high})/2.0$ is returned without execution of a computerized FPTAS based algorithm. An example algorithm is provided below:

---
Algorithm 4 The est$\lambda$ algorithm

1:    calculate $\lambda_{high}, \lambda_{low}$
2:    if $\lambda_{high} < 1.0$ or $\lambda_{low} > 1.0$ then
3:       $\lambda = (\lambda_{high} + \lambda_{low})/2.0$
4:    else
5:       compute $\lambda$ with the FPTAS algorithm described in Algorithm 3.
6:    end if
Output: $\lambda$

---

The combination of a computerized algorithm FPTAS based on a faster modified variant of FAS and the computerized algorithm est$\lambda$ for assessing if $\lambda \geq 1$ may reduce the running time of the bandwidth verification step 110 by a level of 50× compared to the prior art implementation of FAS. In practice, this means for large topologies a reduced running time from days or hours down to minutes and seconds.

Figure 1C:
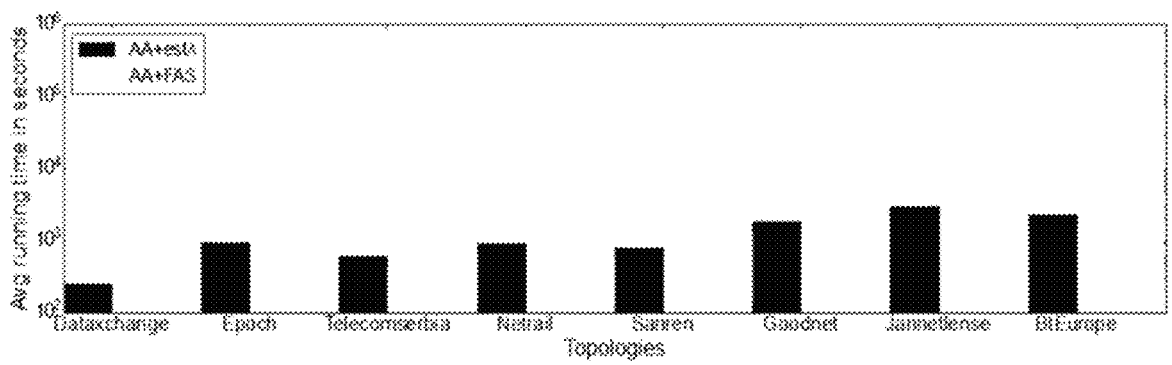
FIG. 01C Illustrates the optimization time with different implementations of the bandwidth verification when Simulated Annealing (denoted AA) is used for mapping and association, which are suitable for application with embodiments of the invention.

FIG. 01C Illustrates the optimization time with different implementations of the bandwidth verification when Simulated Annealing (denoted AA) is used for mapping and association, which are suitable for application with embodiments of the invention. The network topologies are from "The Internet topology zoo. [Online]. Available: http://www.topology-zoo.org/" depicted on the x-axis are arranged in increasing size order.

As shown in FIG. 07A, when combining simulated annealing (AA) for the mapping and association steps with our est$\lambda$ calling the FPTAS algorithm in one embodiment of the invention, the running time under all topologies is significantly reduced compared to using FAS for large networks. In another embodiment of the invention, the Mapping and the Association steps may be implemented by the use of the FTCP algorithm described in prior art "F. J. Rosand P. M. Ruiz, "On reliable controller placements in software-defined networks," Computer Communications, vol. 77, pp. 41-51, 2016" in combination with the est$\lambda$.

FIG. 01D Illustrates the optimization time with different implementations of the bandwidth verification when the FTCP heuristics (FS) is used for mapping and association, which are suitable with embodiments of the invention. The network topologies are from "The Internet topology zoo. [Online]. Available: http://www.topology-zoo.org/" depicted on the x-axis are arranged in increasing size order.

FIG. 01D illustrates significant reduction in running time when FTCP (denoted FS) is combined with est$\lambda$ or FAS, respectively.

Delay and Backlog Bound Verification (Step 111)

The electronic flow delay checker 163 calculates the routability indicator $\chi$ with respect to delay. The computerized delay and backlog bound verification step (step 111) follows the bandwidth verification step (step 110). If $\lambda < 1$, the computerized method returns with $\chi = \lambda$. Otherwise, the electronic flow delay checker 163 shown in FIG. 01A may engage a computerized Genetic Algorithm or a Column Generation Heuristic Algorithm to determine whether there is a routing solution that satisfies the delay and backlog constraints, according to an embodiment of the invention. An example algorithm of the delay and backlog verification step 111 based on CGH is shown below:

---
Algorithm 5 Delay and backlog verification algorithm based on column generation intuition Initialization
1:    Using $L_{max}(u_e + t_e)$ as edge weights, compute $\kappa^* = \{K_f | f \in F\}$, where $K_f$ is the shortest path for flow $f$ under the edge weights.
2:    iter = 0
3:    Relax the binary variable $\delta^{(K)} \in \{0, 1)$ to $\delta^{(K)} \in [0, 1]$
4:    Set $\lambda_{old} = 0$
5:    while (iter < MAXITERATIONS and Neg$_f \neq \emptyset$) do
6:       Solve the optimization problem with the set of paths $\kappa^*$, get $\lambda$
7:       if $\lambda - \lambda_{old} <= 0$ then
8:          Break
9:       end if
10:      $\lambda_{old} = \lambda$
11:      Calculate the duals DE = $\{l_e | e \in E\}$· of constraint (45).
12:      Calculate the duals DF = $\{z_f | f \in F\}$ of constraint (47)
13:      With $l_e$ as the edge weights, compute P = $\{P_f, \text{dist}_f | \forall f \in F\}$, where $P_f$ is the shortest path for flow $f$, and dist$_f$ is the distance of the path.
14:      Neg$_f$ = { }
15:      for f in F do Algorithm 5 Delay and backlog verification algorithm
based on column generation intuition 16:   $res = dist_f - z_f$
17:   if $res < 0$ then
18:     if $\Sigma_{e \in Kf} L_{max}/u_n < D_{max} - \Sigma_{e \in K} t_e$ and
      $b_f^{(Kj)} + L_{max} * H < B_{max}$ then
19:       Add f to $Neg_f$
20:     end if
21:   end if
22:   end for
23:   Select $P_f^*$ that $_{dist f} = \min(\{dist_f | \forall f \in Neg_f\})$
24:   Add $P_f^*$ to $\kappa^*$
25: end while
26: Change $\delta^{(K)} \in [0, 1]$ to $\delta^{(K)} \in \{0, 1\}$
27: Solve the optimization problem with the set of paths $\kappa^*$, get $\lambda$.
Output: $\lambda$ An embodiment of a suitable computerized Genetic Algorithm uses $\{X_f, \forall_f \in F\}$ as the genes. The computerized Genetic Algorithm uses the solution $\{X^*(K)\}$ produced by the bandwidth verification step (step 110), to initialize its population (the initial population are generated by random permutations of $\{X^*(K)\}$. The computerized Genetic Algorithm calculates the fitness of each individual as fitness=min (D max/D*, B max/B*), with D* and B* denoting the delay and backlog bound produced by the individual. After running a certain number of generations, the computerized Genetic Algorithm outputs the $\chi$=max{fitnesses}.

Another embodiment of a suitable computerized Column Generation Heuristic (CGH) Algorithm formulates the delay and backlog verification problem as an optimal flow scheduling problem and checks whether it is possible to schedule all the flows under bandwidth, delay and backlog constraints. However, instead of considering all the possible paths set $\kappa$ when scheduling flows, the CGH algorithm uses certain heuristic to select a small subset of paths $\kappa' \subseteq \kappa$. The key of CGH is to split the problem into a master problem and subproblem. The master problem is here the maximum concurrent flow problem but for a subset of the paths $\kappa' \subseteq \kappa$. The subproblem based on (20) is created to identify new variables that can improve the objective function of the master problem. The heuristic implemented by CGH is comprises three steps, iterated until no new variables can be found: 1) solving the master problem with a subset of the variables and obtaining the values of the duals; 2) considering the subproblem with the dual values and finding the potential new variable; and, 3) repeating step 1) with the new variables that have been added to the subset. This allows us to optimize flow scheduling only within this subset of paths rather than considering the whole set of the paths. By doing this, the search space can be greatly reduced, which can dramatically reduce the running time by the magnitude of 500× for uniform traffic patterns or 1000× for control traffic patterns compared to using MILP solvers such as CPLEX to directly solve the problem as shown in FIG. 01E.

FIG. 01E illustrates a representative time reduction ratio when comparing the CGH algorithm with CPLEX for network topologies of increasing size for uniform traffic (left) and control traffic patterns (right), respectively, suited for embodiments of the invention. The network topologies are from "The internet topology zoo. [Online]. Available: http://www.topology-zoo.org/".

In one embodiment of the invention implementing the CGH, we observe in FIG. 01E the aforementioned reduction for various topologies of increasing size. [SLI19].

Executing the entire process 100 as illustrated in FIG. 01B in an embodiment of the invention can for a mid-sized network topology yield a deployment plan within seconds, as illustrated in FIG. 01F. In an embodiment of the invention, applying CGH rather than CPLEX can lead to a reduction in running time by 80×, in comparison.

FIG. 01F illustrates the time total running time for calculating a deployment plan for combinations of algorithms implementing various embodiments of the invention. The network topology "InternetMCI" is available at "The internet topology zoo. [Online]. Available: http://www.topology-zoo.org/".

Exemplary Use Cases Employing Embodiments of the Invention

One can apply at least two use cases to embodiments of the invention described herein.

Case 1: Computer-Implementable Deployment Strategy Output

Figure 2:
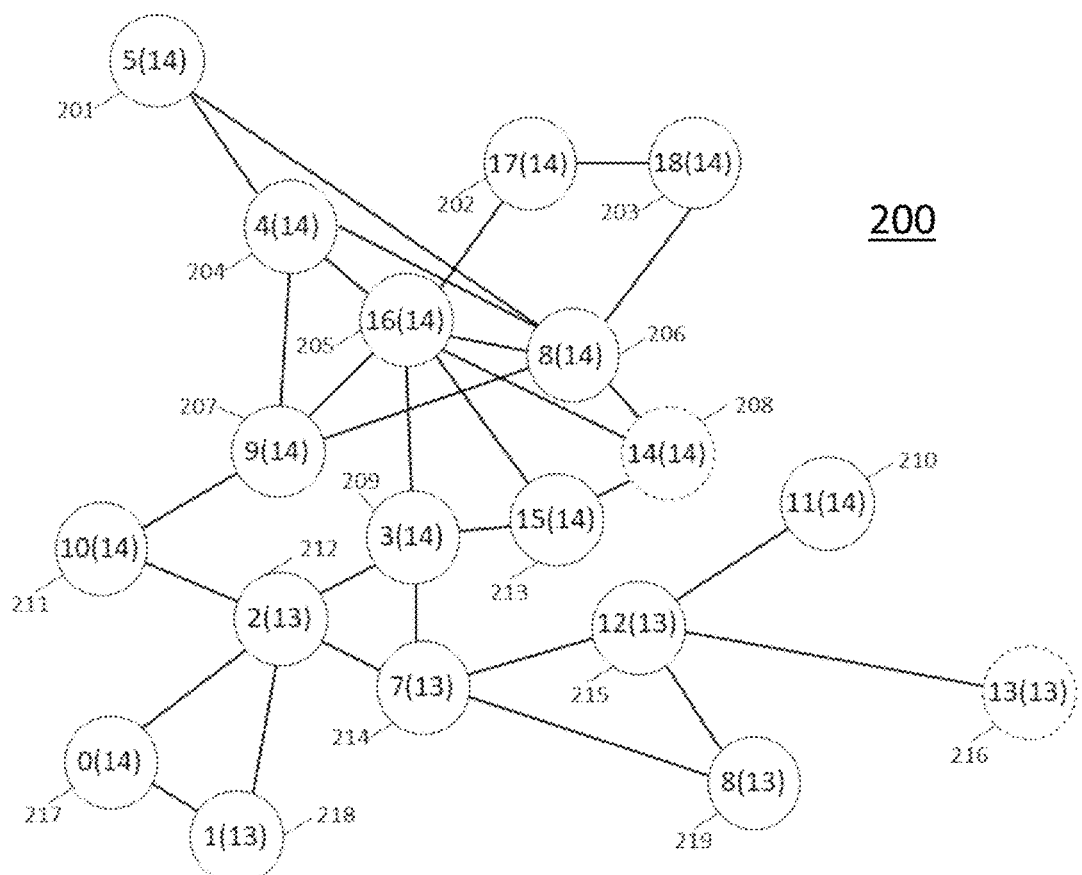
FIG. 02 illustrates a controller computer-implementable deployment strategy operating under certain constraints and a given network topology 200, according to an embodiment of the invention.

FIG. 02 illustrates a computerized processing entity deployment strategy operating under certain constraints and a given network topology 200, according to an embodiment of the invention. FIG. 02 further illustrates a corresponding deployment plan employing computerized processing entity instances (201-204) of the computerized processing entity instances 201-219 and an association plan (denoted as Node ID/Associated Processing entity ID, e.g., for the computerized processing entity instance 205, the Node ID is 1 and the Associated Processing entity ID is 13, as shown in FIG. 2), in an instance when the minimum required reserved bandwidth is 36 MBits/s per data transmission link, given the reliability threshold $\beta$=0:99999 and requirement $R_{min} > \beta$.

The network topology 200 is taken from the Internet topology Zoo (ITZ) known as "Internetmci". For simplicity, the computerized method may assume an in-band control scheme that M=N=T, according to an embodiment of the invention.

The electronic data transmission scheduling system 160 may further assume that each node of the nodes 201-219 holds an electronic aggregator having a request rate of 500 requests/s and link propagation delay ranges [1 ms, 10 ms] and that the operational probability of each node 201-219, data transmission link and computerized processing entity is 0.9999. Given a reliability, bandwidth and backlog constraints as ($\beta$=0.9999, $u_e$=400 Mbits/s, $B_{max}$=10 MBytes), embodiments of the invention may output a computerized processing entity deployment solution that ensures worst case flow delay of 180 ms, as shown in FIG. 2.

Case 2: Analytic Tool

Embodiments of the invention may provide an electronic data transmission scheduling system 160 that provides a computerized analytic tool, possibly in the form of a physical simulator, configured to systematically assess the impact of a given computer-implementable deployment strategy relative to reliability, bandwidth and flow delay. For example, embodiments of the electronic transmission scheduling system 160 can quantify the influence on the achieved maximum reliability relative to an increasing data transmission link bandwidth constraint (see, FIG. 3). In this embodiment, given flow delay and backlog constraints fixed, by varying the bandwidth of data transmission links in a network, the computer-implemented method can test how good deployment solutions for the workflow 100 shown in FIG. 01B can found in terms of reliability. The electronic transmission scheduling system 160 may detect that when scaling up the data transmission link bandwidths in a network topology, the failure probability decreases, and hence $R_{min}$ increases. This example illustrates how service providers and operators can use embodiments of the invention as a practical tool for quantifying the trade-off between bandwidth and reliability. It may help them to make decisions such as how much investment should be put on upgrading the network infrastructure, and what is the expected gain on reliability.

Figure 3:
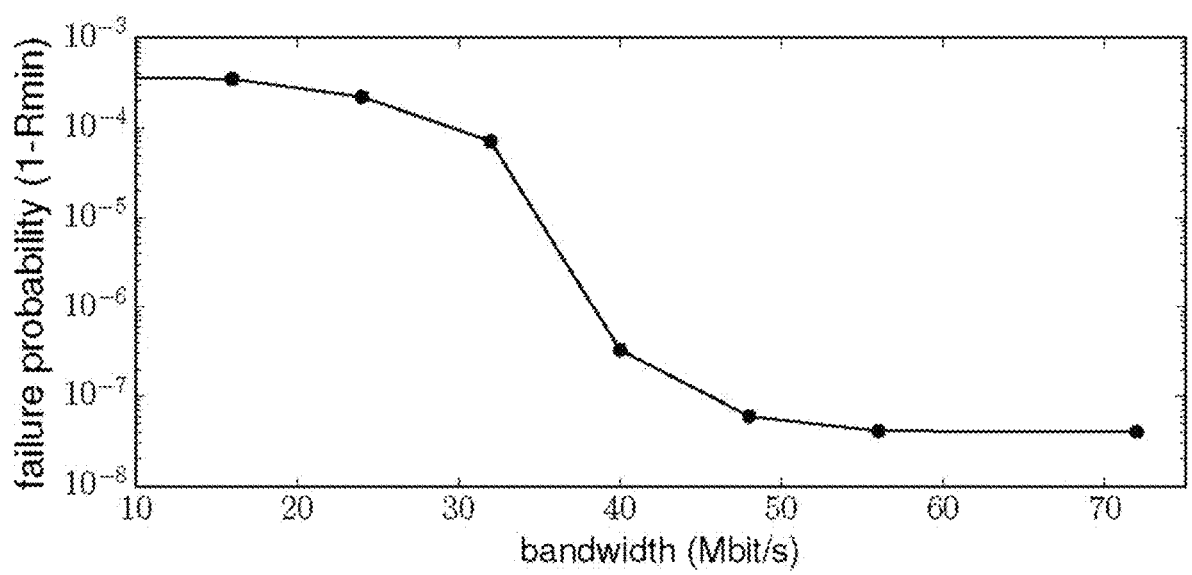
FIG. 03 provides a graph of failure probability versus link bandwidth that may be used by a computerized system to determine the optimal trade-off between required reliability and associated bandwidth demands, according to an embodiment of the invention.

FIG. 03 provides a graph of failure probability versus link bandwidth that may be used by the electronic data transmission scheduling system 160 may determine what are the minimum data transmission link bandwidths that a worst-case-delay-guaranteed deployment solution needs.

Figure 4A:
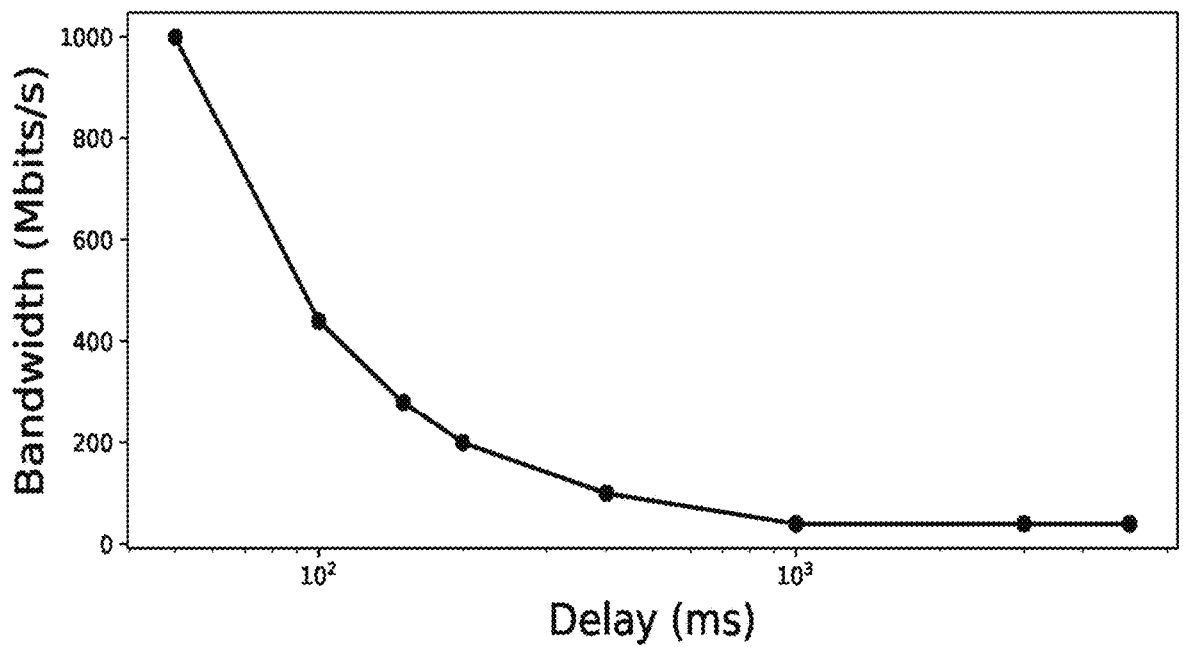
FIG. 04A provides a graph that quantifies the influence on the required bandwidth relative to the worst-case delay bound constraints of control traffic flows, according to an embodiment of the invention.
Figure 4B:
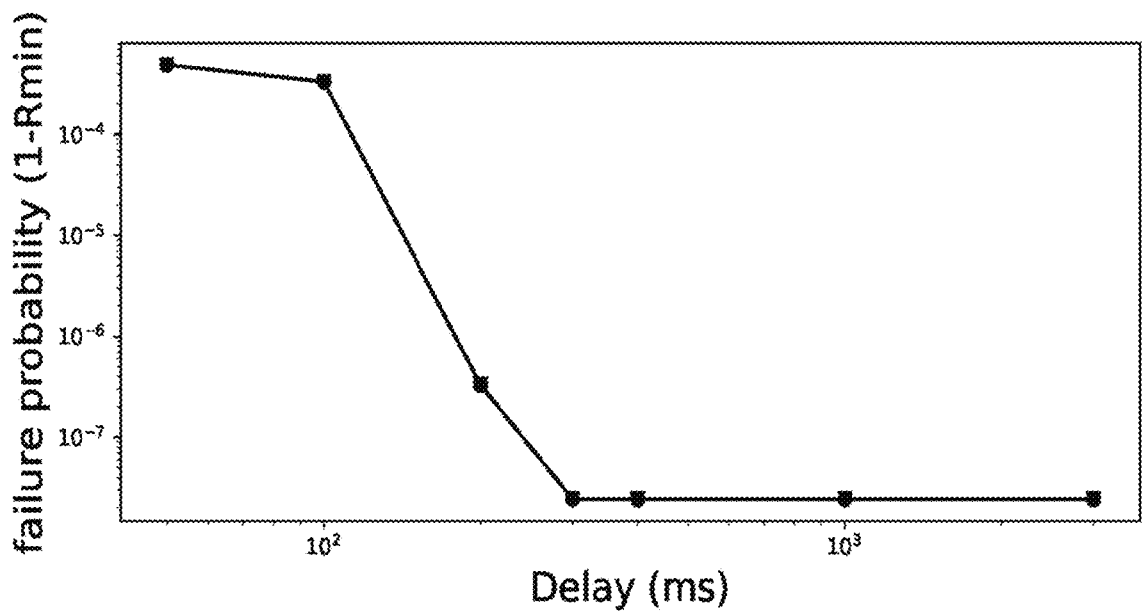
FIG. 04B provides a graph that quantifies the influence on the reliability relative to the worst-case delay bound constraints of control traffic flows, according to an embodiment of the invention.

FIG. 04B provides a graph that quantifies the influence on the achieved reliability relative to the worst-case delay constraints of control traffic flows, according to an embodiment of the invention. Given the bandwidth and backlog constraints fixed, with different delay bounds requirement, a computerized system can determine what are the maximum reliability a deployment solution can achieve.

As the electronic data transmission scheduling system 160 reduces the delay bound, the required bandwidth for guaranteeing such a delay bound increases, as shown in FIG. 4A. The graph shown in FIG. 4A illustrates how service providers and operators can employ embodiments of the invention as a practical tool for quantifying the trade-off between the flow delay they want to guarantee and the bandwidths of the network infrastructure they should have, enabling development of flexible and fine-tuned computerized processing entity deployment policies.

Example #2: Deployment of VMs for a Cloud Computing Task

Deploying and executing a computational task in a distributed big data framework and architecture (e.g., Apache Spark or similar), is essentially identical to deploying a distributed control plane. Such an architecture generally allows for distributing a computation task within or across geo-distributed data centers. Within the context of a cloud computing application of a distributed cloud computing architecture, a manager entity, such a computerized management function within data transmission node 171 shown in FIG. 01A carries out computational tasks by controlling one or many computerized worker entities. Each computerized worker entity (e.g., switches 192) may host one or several computerized distributed agents which each may handle one or several computation tasks.

In this context, the electronic data transmission scheduling system 160 may map the deployment of a distributed computational infrastructure (or application), by deciding the distributed set of managers (the number and location in a network topology) and the association of computerized worker entities, according to an embodiment of the invention. In the cases when the framework (or similar) allows for it, embodiments of the invention could also be applied to also associate worker entities (e.g., switches like 192) to distributed agents running on external nodes.

Such a deployment may be viewed as an abstract overlay representing the intercommunication necessary to solve a big data problem in a distributed manner and with guaranteed network reliability and performance. Embodiments of the invention may thus be used to deploy entities for executing cloud computations while accounting for reliability, bandwidth and flow delay, such that the requirements in critical cloud computing applications (e.g., to support decision-making in real-time services) can be adequately met.

Note that embodiments of the invention focus on network I/O constraints of a computing infrastructure and generally not on the computational resources of each computational entity. To accomplish this task, additional constraints like the computation capability of a computerized worker need to be considered, which decides how many executors can co-exist on a worker or on another host.

Application Example #3: Deployment of a VNF Service Chain

Embodiments of the invention may be used to deploy service chains comprising a series of connected VNF instances. In this case, embodiments of the invention, namely the electronic data transmission scheduling system 160, essentially deploy computerized processing entities (e.g., data transmission nodes 171) (corresponding to the VNFs) without associating any electronic aggregator nodes—consequently, the reliability requirement becomes irrelevant.

Hence, computerized processing associated with this embodiment of the invention is simplified to placement of a given number of VNFs on a network topology while accounting only for bandwidth and flow delay requirements. In practice this is achieved by setting the reliability R(G, j, C)=1) and assuming N∈Ø. To solve the deployment problem, a computerized system executes the steps from Workflow 100 shown in FIG. 01B, except for the "Association" step (step 105 shown in FIG. 01B), according to an embodiment of the invention.

Additional Considerations Regarding Network Calculus

Figure 5:
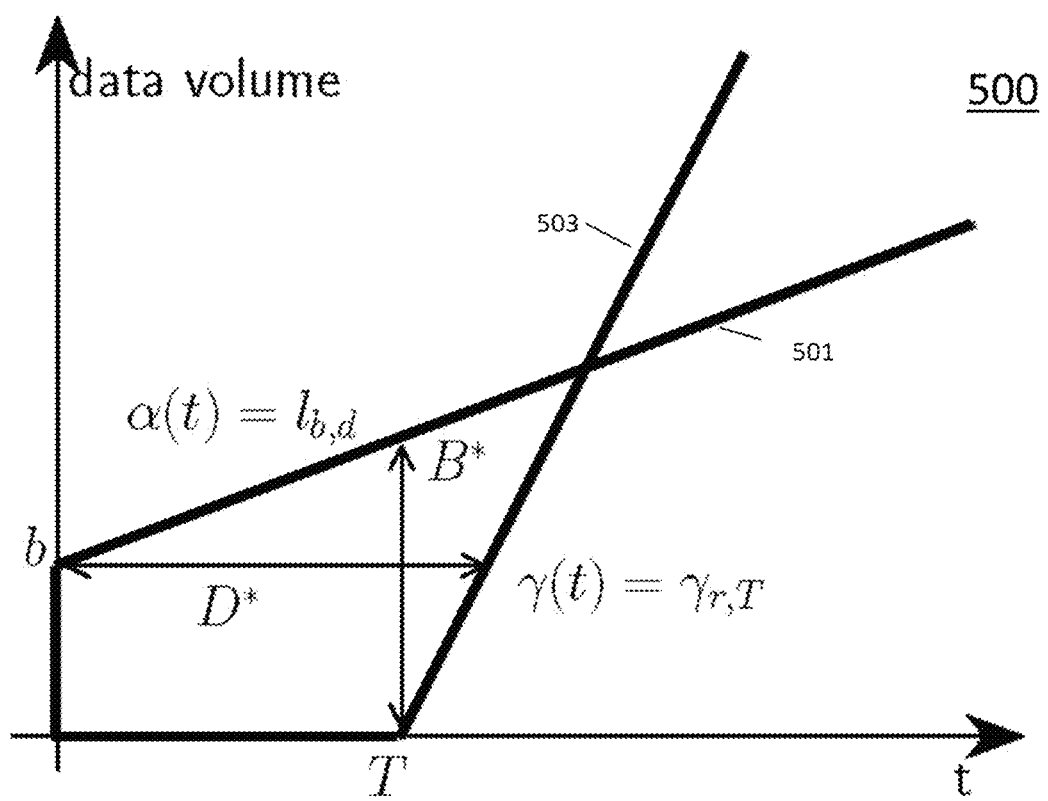
FIG. 05 illustrates an example of graphical computation of delay bound and backlog bound using network calculus concepts, according to an embodiment of the invention.

FIG. 05 illustrates an example of graphical computation of flow delay bound and backlog bound using network calculus concepts, according to an embodiment of the invention. The flow delay and backlog bounds respectively correspond to the maximum horizontal and vertical deviations between the arrival and service curves.

Network calculus ("NC") comprises a system theory for communication networks. An NC system can range from a simple queue to a complete network. With the models of a considered flow and of the service a so-called system can offer, three bounds can be calculated by network calculus, which are (i) the delay bound the flow will experience traversing the system, (ii) the backlog bound the flow will generate in the system, and (iii) the output bound of the flow after it has passed the system. The theory is divided in two parts: deterministic network calculus, providing deterministic bounds, and stochastic network calculus, providing bounds following probabilistic distributions. The discussion here only considers the former.

As an explanation for the motivation behind the optimization formulation (discussed herein) that is behind the flow delay checker 163, note that the arrival curve 501 and service curve 503 are the two key concepts in the network calculus. Among other things, the electronic flow delay checker 163 shown in FIG. 01A employs the curve 501 and the curve 503 in optimizing delay and backlog bounds. The arrival curve α(t) 501 defines the upper bound of the injected traffic during any time interval. Suppose the total amount of data a flow sends during any time interval [t1, t2] is $R(t_2)-R(t_1)$, where R(t) is the cumulative traffic function which define the traffic volume coming from the flow within the time interval [0, t]. A wide sense increasing function α(t) is the arrival curve of the flow if $\forall t_1, t_2, 0 \le t_1 \le t_2$, if it satisfies $$R(t_2)-R(t_1) \le \alpha(t_2-t_1) \quad (19)$$

In practice, a linear arrival curve is widely used to characterize the flow injection in a network. The modeling of a flow f uses a so-called arrival curve $\alpha_f(t)=1_{b_f\,d_f}=d_f t+b_f$ where $d_f$ is the sustainable arrival rate and $b_f$ is the burst/ness. The linear arrival curve 501 shown in FIG. 5 can be interpreted as that the flow can send bursts of up to $b_f$ bytes but its sustainable rate is limited to $d_f$ B/s. A flow can be enforced to conform to the linear arrival curve 501 by applying regulators, for example, leaky-buckets.

The Service Curve $\gamma(t)$ 503 models a network element, e.g. a switch or a channel, expressing the service capability. Its general interpretation is less trivial than for the arrival curve 501. The service curve $\gamma$503 shown in FIG. 5 can be interpreted as that data of a flow has to wait up to T seconds before being served at a rate of at least r B/s. This type of service curve is denoted by $\gamma_{r,T}$ and is referred to as a rate-latency service curve.

From the two curves 501, 503, the three above mentioned bounds can be calculated by the electronic flow delay checker 163, as shown in FIG. 5. The flow delay bound is graphically the maximum horizontal deviation between $\alpha(t)$ and $\gamma(t)$. Its general interpretation is less trivial than for the arrival curve 501. As shown in FIG. 5, the backlog bound corresponds to the largest vertical distance between $\alpha(t)$ and $\gamma(t)$. Consider the case with linear arrival curve 501 and rate-latency service curve 503, the flow delay bound can be calculated as $$D^* = T + b/r \quad (20)$$

and the backlog bound as $$B^* = b + Td. \quad (21)$$

Thus, D* and B* relate to each other as shown by equations (20), (21).

In the general case, the computation of the output bound $\alpha^*$, the arrival curve of the flow after traverse the system, is calculated by min-plus deconvolution between $\alpha(t)$ and $\gamma(t)$, as $\alpha^*$ $$\alpha^* = (\alpha \oslash \gamma)(t) == \sup_{u \geq 0} \{\alpha(t+u) - \gamma(u)\} \quad (22)$$

The computation is not straightforward, since it involves the deconvolution operation defined by min-plus algebra. However, in the case that a flow is modelled by a linear arrival curve and served by a rate-latency service curve, one simply has $\alpha^* = l_{b+T, r} = rT + b + rT$.

Concatenation Property of Network Calculus

Assume a flow traverses two systems that provides service curve $\gamma_1$ and $\gamma_2$ respectively. Then, the Equivalent Service Curve (ESC) by the concatenated system is calculated by min-plus convolution between $\gamma_1$ and $\gamma_2$, as $$\gamma(t) = (\gamma_1 \otimes \gamma_2)(t) = \inf_{0 \leq s \leq t} \{\gamma_1(t-s) + \gamma_2(s)\} \quad (23)$$

In particular, if both $\gamma_1$ and $\gamma_2$ are rate-latency service curves, e.g. $\gamma_1 = \gamma_{r1, T1}$ and $\gamma_1 = \gamma_{r2, T2}$, we can simply have $\gamma = \gamma_1 \otimes \gamma_2 = \gamma_{min(r1, r2), T1+T2}$. A computerized system can thus deduce the ESC for a given flow that traverses multiple network elements (e.g. switches) in a system by applying the concatenation property.

Applying Network Calculus for Calculating the Delay Bound of a Deployment Plan

A computerized system such as the electronic flow delay checker 163 can apply Network Calculus in computing the delay and backlog verification step (step 111 shown in FIG. 01B), as follows:

1. Assume that each computerized node (and/or application specific hardware) uses a certain guaranteed performance service discipline to schedule flows that sharing a data transmission link. How to handle different guaranteed performance service disciplines and their corresponding service curves are known to those skilled in the art. Generally speaking, such a service curve is a function of the reserved guaranteed service rate (X(K)) of the flow.

2. A path can traverse several nodes and data transmission links and can be viewed as a concatenation of systems. Thus, given the reserved service curve of a flow at each of such nodes, by applying the concatenation property, a computerized system can derive the ESC of the entire path for a target flow by applying equation (23). In general, the ESC of the path is still a function of reserved guaranteed service rate (X(K)) of the flow. However, X(K) needs to satisfy constraints (5) (6) (7) (9) (11).

3. A computerized system such as the electronic flow delay checker 163 can split and route a flow on a list of selected paths $\kappa'_f$. Suppose the arrival curve of a flow is $\alpha_f = l_{bf, df}$ after splitting, the computerized system such as the electronic flow delay checker 163 obtains a number of sub-flows $\{f^{(K)}\}$, with each one having the arrival curve $\alpha_{f(K)} = l_{bf(K), df(K)}$. A computerized system such as the electronic flow delay checker 163 may assume $b_{f(K)} = b_f$ by considering the worst case. The computerized system such as the electronic flow delay checker 163 also has the $\Sigma_{K \in k_f} d_{f(K)} = d_f$ (constraints (8)), indicating that the summation of all the sub-flow demands should be equal to the demand of their aggregated flow.

4. Now, given the arrival curve of a sub-flow and the corresponding service curve of the path for routing the sub-flow, the computerized system such as the 163 can calculate the delay bound (D*) and backlog bound (B*) for the sub-flow with equation (20), (21) respectively. Such bounds should satisfy the delay and backlog constraints (constraints (9) (10)).

One note regarding how burstiness relates to $\chi$. The burstiness of a flow is calculated in the electronic resource planner 164 in the Traffic Estimation step according to the definition of the linear arrival curve mentioned above. The burstiness directly impacts the worst-case flow delay (D*) of a flow, see equation (20).

As noted above, in some embodiments of the invention and under certain circumstances, queuing theory, for example, may be also used for calculating a stochastic delay bound instead of Network Calculus.

Introduction of the column generation heuristic algorithm for delay and backlog verification.

The delay and backlog verification problem can be formulated as the Mixed Integer Linear programming (MILP) problem specified in (24)-(33). By solving the optimization problem, if we obtain $\chi \geq 1$, it indicates that a feasible routing solution satisfy bandwidth, delay and backlog constraints is found. The number of binary variables $\delta(K)$ in the problem could be potentially very large, since it equals to the number of possible paths in a network topology, which increases exponentially with the size of the network topology.

$$\text{maximize } \chi \tag{24}$$

$$\text{s.t.:} \sum_{K:e \ni K} X(K) \leq u_e, \forall e \in E \tag{25}$$

$$X(K) \geq 0, \forall K \in \kappa \tag{26}$$

$$\sum_{K \in \kappa_f} d_f^{(K)} \geq \chi d_f, \forall f \in F \tag{27}$$

$$ts_f^{(K)} X(K) + b_f^{(K)} \delta^{(K)} \leq \left(D_{max} - \sum_{e \in K} t_e\right) X(K),$$

$$\forall K \in \kappa_f, \forall f \in F \tag{28}$$

$$b_f^{(K)} \delta^{(K)} + ts_f^{(K)} d_f^{(K)} \leq B_{max}, \forall K \in \kappa_f, \forall f \in F \tag{29}$$

$$X(K) \leq M \delta^{(K)} \tag{30}$$

$$d_f^{(K)} \leq X(K), \forall K \in \kappa_f, \forall f \in F \tag{31}$$

$$d_f^{(K)} \geq 0, \forall K \in \kappa_f, \forall f \in F \tag{32}$$

$$\delta^{(K)} \in \{0, 1\}, \forall K \in \kappa \tag{33}$$

To solve such large-scale optimization problem, embodiment of the invention may perform computerized column generation in the electronic flow delay checker 163. The key idea of column generation is to split the original problem into two problems: a master problem and a subproblem. The master problem is the original problem but with only a subset of the variables being considered. The subproblem is created to find a new variable that could potentially improve the objective function of the master problem. Usually, the dual of the original problem is used in the subproblem with the purpose of identifying new variables. The kernel of the column generation method defines such an iterative process: 1) solving the master problem with a subset of the variables and obtaining the values of the duals, 2) considering the subproblem with the dual values and finding the potential new variable, and 3) repeating step 1) with the new variables that have been added to the subset. The whole process is repeated until no new variables can be found.

For the delay and backlog verification problem, intuitively, if the computerized system ignores the constraints on delay and backlog, the optimization problem would be reduced to a maximum concurrent flow problem as formulated in (15)-(18). And the dual problem is specified in (19)-(23). With the column generation method, the master problem is the maximum concurrent flow problem (specified in (15)-(18)) but with a subset of the paths $\kappa' \subseteq \kappa$. The corresponding subproblem can use (20) to identify the new potential paths: the potential paths are the ones that violates (20).

However, because of delay and backlogs constraints (9) and (10), the new potential path variables need to additionally obey $ts_f^{(K)} \leq D_{max} - \Sigma_{e \in K} t_e$ and $b_f^{(K)} \leq B_{max}$. Otherwise, constraints (9) and (10) will certainly be violated if they are chosen for routing flows ($\delta(K)=1$).

Figure 6:
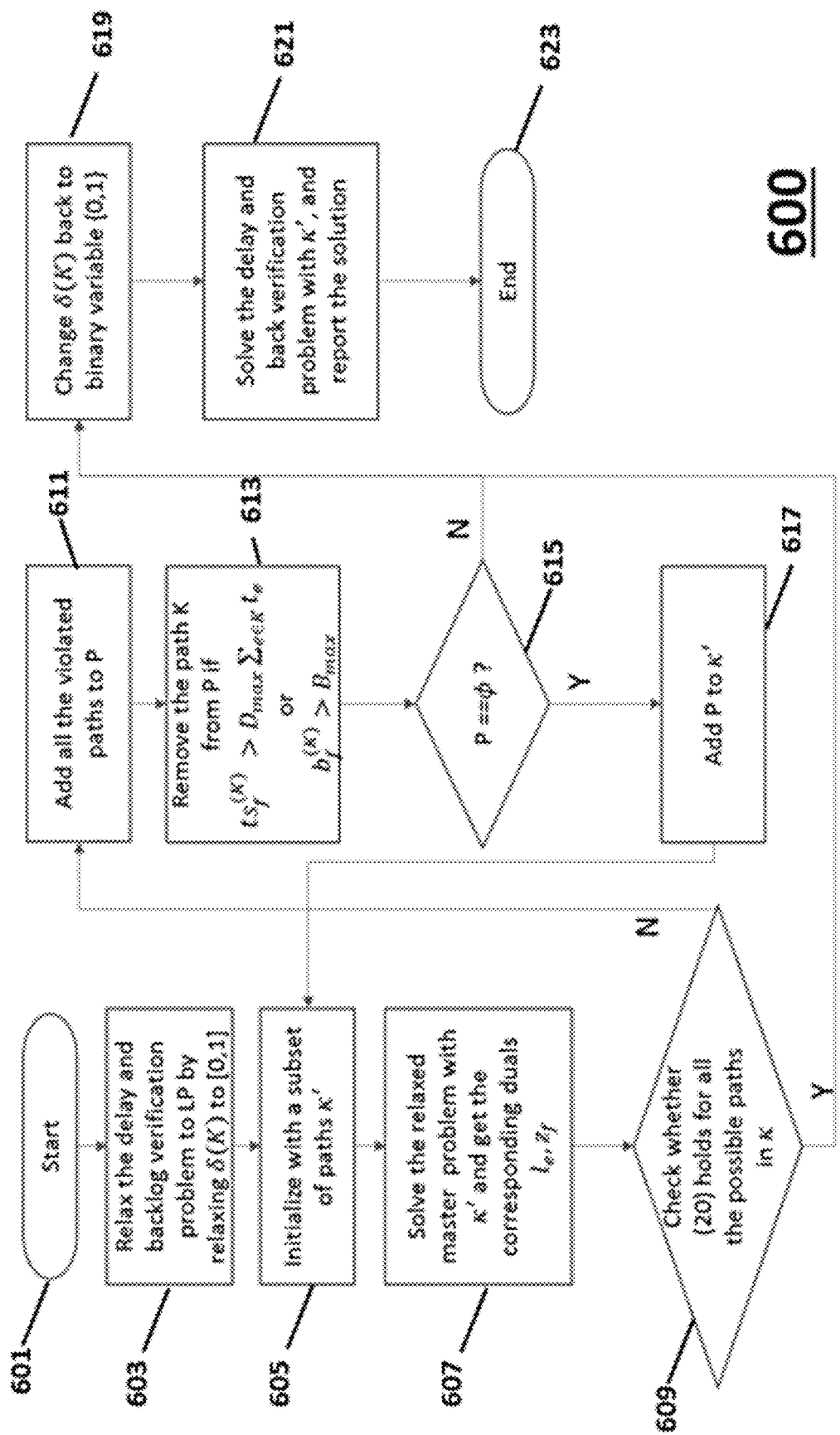
FIG. 06 illustrates a computerized method in a pseudo algorithm form that will assist the potential path variables satisfy the delay and backlog constraints (9) and (10) while satisfying other appropriate conditions, according to an embodiment of the invention.

FIG. 06 illustrates a pseudo algorithm that will assist the potential path variables satisfy the delay and backlog constraints (9) and (10) while satisfying other appropriate conditions, according to an embodiment of the invention.

As shown in step 603, the algorithm run in the electronic flow delay checker 163 relaxes the delay and backlog verification problem (which is MILP) to linear programming problem (LP) by relaxing the binary variable $\delta^{(K)}$ to [0, 1].

As shown in step 605, the electronic flow delay checker 163 initiates with a subset of paths $\kappa'$. For example, the electronic flow delay checker 163 can initiate the subset by using the link propagation delay $t_e$ as edges weights and provide the corresponding shortest paths as $\kappa'$.

As shown in steps 607-621, the electronic flow delay checker 163 then begins a repetitive process for adding new paths:

1) solve the relaxed master problem and obtain values of the duals of the constraints imposed on edges and flows (step 607);
2) check whether dual constraint (20) hold for all the paths (step 609), if yes, add them into a set P (step 611);
3) remove the paths from P that would certainly violate delay and backlog constraints (step 613);
4) check (step 615) if there are remaining paths in P. If yes (step 617), add them to the subset $\kappa'$, and repeat the process again from 1) (step 605).

Note that if the answer of step 609 and step 615 is no, it means no new paths can be found. In this case, we restrict the $\delta^{(K)}$ variable back to binary values {0, 1} (step 619), and solve the delay and backlog verification problem with the subset of the paths $\kappa'$ found by the iterative process (step 621).

Note also that at step 609, when checking whether existing paths violate (20), the electronic flow delay checker 163 does not need to iterate over all the possible paths. The electronic flow delay checker can simply use $l_e$ as edge weights and use Dijkstra's Shortest Path First algorithm to get all the shortest paths with $l_e$. If all the shortest paths satisfy (20) (that the distance of each path is larger than $z_f$), then any path $K \in \kappa$ must have $\Sigma_{e \in K} l_e \geq z_f$ (20). Otherwise, the electronic flow delay checker 163 just adds the shortest paths that violate (20) to P, as the step 2) suggests.

Naturally, embodiments of the invention may employ MILP solvers, such as CPLEX, in the electronic flow delay checker 163 to directly solve the delay and backlog verification problem (24)-(33) (Step 621). The inventors refer to such an approach a CPLEX-direct method. However, using a CPLEX-direct method is very time consuming, since it needs to consider all the possible flow paths, the number of which increases exponentially with the size of the considered network topology. In comparison, the CGH algorithm described here uses much fewer paths. Usually, even for large network topologies, the iteration process terminates within a few hundred rounds. Therefore, the number of paths being considered in $\kappa'$ can be thousands of times less when compared to the number of paths used by the CPLEX-direct method, resulting in much shorter running time. Note that this computerized method is a heuristic algorithm, which means that there is no guarantee that the computerized method can find the optimal or approximate the optimal result. In one implementation of the algorithm, a running time reduction at the levels of 500× (or more) over the CPLEX-direct method can be achieved, while yielding nearly as optimal results as the CPLEX-direct method.

Further modifications of the invention within the scope of the appended claims are feasible. As such, the present invention should not be considered as limited by the embodiments and figures described herein. Rather, the full scope of the invention should be determined by the appended claims, with reference to the description and drawings.

Various embodiments of the invention have been described in detail with reference to the accompanying drawings. References made to particular examples and implementations are for illustrative purposes and are not intended to limit the scope of the invention or the claims.

It should be apparent to those skilled in the art that many more modifications of the computerized method and system described here besides those already described are possible without departing from the inventive concepts herein. The inventive subject matter, therefore, is not to be restricted except by the scope of the appended claims. Moreover, in interpreting both the specification and the claims, all terms should be interpreted in the broadest possible manner consistent with the context.

Headings and sub-headings provided herein have been provided as an assistance to the reader and are not meant to limit the scope of the invention disclosed herein. Headings and sub-headings are not intended to be the sole or exclusive location for the discussion of a particular topic.

While specific embodiments of the invention have been illustrated and described, it will be clear that the invention is not limited to these embodiments only. Embodiments of the invention discussed herein may have generally implied the use of materials from certain named equipment manufacturers; however, the invention may be adapted for use with equipment from other sources and manufacturers. Equipment used in conjunction with the invention may be configured to operate according to conventional methods and protocols and/or may be configured to operate according to specialized protocols. Numerous modifications, changes, variations, substitutions and equivalents will be apparent to those skilled in the art without departing from the spirit and scope of the invention as described in the claims. In general, in the following claims, the terms used should not be construed to limit the invention to the specific embodiments disclosed in the specification but should be construed to include all systems and methods that operate under the claims set forth herein below. Thus, it is intended that the invention covers the modifications and variations of this invention provided they come within the scope of the appended claims and their equivalents.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

We claim:

1. An electronic data transmission scheduling system for a computer network having a plurality of computerized data transmission nodes and a plurality of electronic aggregators, wherein each computerized data transmission node of the plurality of computerized data transmission nodes has at least one data transmission link of a plurality of data transmission links to another computerized data transmission node of the plurality of computerized data transmission nodes, and wherein each electronic aggregator of the plurality of electronic aggregators forwards data to a set of computerized data transmission nodes of the plurality of computerized data transmission nodes, a configuration of the plurality of computerized data transmission nodes and the plurality of data transmission links collectively forming a network topology, the electronic data transmission scheduling system, comprising:

an electronic reliability checker that examines possible data transmission routes between computerized data transmission nodes of the plurality of computerized data transmission nodes and data transmission links of the plurality of data transmission links to determine a network mapping reliability score for the network topology, wherein the network mapping reliability score represents a probability that an electronic aggregator of the plurality of the electronic aggregators connects to at least one computerized data transmission node of a set of computerized data transmission nodes given computerized data transmission node and data transmission link failure probabilities;

an electronic bandwidth checker configured to calculate bandwidth allocations and a flow routing plan for the network topology, wherein the electronic bandwidth checker develops calculated bandwidth allocations and the flow routing plan by testing different combinations of data transmission links from the plurality of data transmission links and different combinations computerized data transmission nodes of the plurality of computerized data transmission nodes, wherein the electronic bandwidth checker calculates bandwidth allocations and the flow routing plan for the network topology to ensure flow routability in line with predetermined bandwidth requirements, by evaluating routability of different combinations of inter-traffic between computerized data transmission nodes in the plurality of computerized data transmission nodes given the network topology and estimated traffic characteristics and flow demands, wherein the network topology comprises a mapping of the plurality of computerized data transmission nodes to the network topology and associations between computerized data transmission nodes and the plurality of computerized data transmission nodes, wherein the electronic bandwidth checker further calculates bandwidth allocations for the network topology by computing whether all flows can be routed without overloading any transmission links from the plurality of data transmission links relative to predetermined bandwidth constraints, with all possible paths; and an electronic resource planner that applies the network mapping reliability score from the electronic reliability checker, traffic characteristics and demands, and the calculated bandwidth allocations and the flow routing plan from the electronic bandwidth checker to evaluate and develop a computer-implementable deployment strategy that directs rearrangement of the network topology, by calculating and evaluating a trade-off between the network mapping reliability score, estimated bandwidth demands, the calculated bandwidth allocations and the flow routing plan that satisfies predetermined requirements for reliability and bandwidth.

2. The electronic data transmission scheduling system of claim 1, wherein the electronic reliability checker determines the network mapping reliability score for the network topology relative to a predetermined reliability requirement, wherein the electronic reliability checker further determines the network mapping reliability score by calculating a lower reliability bound.

3. The electronic data transmission scheduling system of claim 1 wherein the electronic bandwidth checker calculates the bandwidth allocations for the network topology by calculating a maximum concurrent flow, according to an equation:

$$\text{maximize } \lambda \tag{15}$$

$$\text{s.t.: } \sum_{K:\varepsilon \ni K} X(K) \leq u_e, \forall\, e \in E \tag{16}$$

$$\sum_{K \in \kappa_f} X(K) \geq \lambda d_f, \forall\, f \in F \tag{17}$$

$$X(K) \geq 0, \forall\, K. \tag{18}$$

4. The electronic data transmission scheduling system of claim 1, wherein the electronic reliability checker comprises a first field-programmable gate array (FPGA), wherein the electronic bandwidth checker comprises a second field-programmable gate array (FPGA), and wherein the electronic resource planner comprises a third field-programmable gate array (FPGA).

5. The electronic data transmission scheduling system of claim 1, wherein the electronic resource planner evaluates and calculates the mapping and association of computerized transmission nodes and the plurality of computerized transmission nodes, by assessing the calculated reliability score, traffic characteristics and demands, routing plan and the routability of the calculated bandwidth allocations and calculated end-to-end delay, relative to predetermined requirements for reliability, bandwidth and end-to-end delay,
wherein the electronic data transmission scheduling system further comprises estimation of traffic characteristics and demands.

6. An electronic data transmission scheduling system for a computer network having a plurality of computerized data transmission nodes and a plurality of electronic aggregators, wherein each computerized data transmission node of the plurality of computerized data transmission nodes has at least one data transmission link of a plurality of data transmission links to another computerized data transmission node of the plurality of computerized data transmission nodes, and wherein each electronic aggregator of the plurality of electronic aggregators forwards data to a set of computerized data transmission nodes of the plurality of computerized data transmission nodes, a configuration of the plurality of computerized data transmission nodes and the plurality of data transmission links collectively forming a network topology, the electronic data transmission scheduling system, comprising:
an electronic reliability checker that examines possible data transmission routes between computerized data transmission nodes of the plurality of computerized data transmission nodes and data transmission links of the plurality of data transmission links to determine a network mapping reliability score for the network topology, wherein the network mapping reliability score represents a probability that an electronic aggregator of the plurality of the electronic aggregators connects to at least one computerized data transmission node of a set of computerized data transmission nodes given computerized data transmission node and data transmission link failure probabilities;
an electronic bandwidth checker configured to calculate bandwidth allocations and a flow routing plan for the network topology, wherein the electronic bandwidth checker develops calculated bandwidth allocations and the flow routing plan by testing different combinations of data transmission links from the plurality of data transmission links and different combinations computerized data transmission nodes of the plurality of computerized data transmission nodes; and
an electronic resource planner that applies the network mapping reliability score from the electronic reliability checker, traffic characteristics and demands, and the calculated bandwidth allocations and the flow routing plan from the electronic bandwidth checker to evaluate and develop a computer-implementable deployment strategy that directs rearrangement of the network topology, by calculating and evaluating a trade-off between the network mapping reliability score, estimated bandwidth demands, the calculated bandwidth allocations and the flow routing plan that satisfies predetermined requirements for reliability and bandwidth,
wherein the electronic resource planner further calculates mapping and association of network traffic given performance requirements on reliability and bandwidth for each data transmission link of the plurality of data transmission links.

7. The electronic data transmission scheduling system of claim 6, wherein the electronic resource planner further estimates traffic characteristics and flow demands in the computer network and wherein the electronic resource planner further evaluates and calculates the mapping and association of computerized transmission nodes of the plurality of computerized transmission nodes, by assessing a calculated reliability score, traffic characteristics, flow demands, routing plan and routability of the calculated bandwidth allocation, relative to predetermined reliability and bandwidth requirements.

8. The electronic data transmission scheduling system of claim 7, wherein the electronic resource planner evaluates and calculates the mapping and association of computerized transmission nodes and the plurality of computerized transmission nodes, by assessing the calculated reliability score, traffic characteristics and demands, routing plan and the routability of the calculated bandwidth allocations and calculated end-to-end delay, relative to predetermined requirements for reliability, bandwidth and end-to-end delay,
wherein the electronic data transmission scheduling system further comprises estimation of traffic characteristics and demands.

9. The electronic data transmission scheduling system of claim 6 wherein the electronic resource planner calculates the mapping and association of the network traffic by randomly adding or removing a computerized data transmission node of the plurality of computerized processing nodes using an existing network topology map, wherein the electronic resource planning calculates a computer-implementable cost (energy) function for evaluating a new solution as:

$$\text{cost} = \min\left(0,\, \log_{10} \frac{1-R_{min}}{1-\beta},\, \lambda - 1\right).$$

10. The electronic data transmission scheduling system of claim 6, wherein the electronic bandwidth checker calculates bandwidth allocations and the flow routing plan for the network topology to ensure flow routability in line with predetermined bandwidth requirements, by evaluating routability of different combinations of inter-traffic between computerized data transmission nodes in the plurality of computerized data transmission nodes given the network topology and estimated traffic characteristics and flow demands, wherein the network topology comprises a mapping of the plurality of computerized data transmission nodes to the network topology and associations between computerized data transmission nodes and the plurality of computerized data transmission nodes.

11. The electronic data transmission scheduling system of claim 10, wherein the electronic bandwidth checker further calculates bandwidth allocations for the network topology by computing whether all flows can be routed without overloading any transmission links from the plurality of data transmission links relative to predetermined bandwidth constraints, with all possible paths, and
wherein the electronic bandwidth checker calculates the bandwidth allocations for the network topology by calculating a maximum concurrent flow, according to an equation:

maximize
s.t.:

$$\lambda \quad (15)$$

$$\sum_{K:e \in K} X(K) \leq u_e, \forall e \in E \quad (16)$$

$$\sum_{K \in k_f} X(K) \geq \lambda d_f, \forall f \in F \quad (17)$$

$$X(K) \geq 0, \forall K. \quad (18)$$

12. The electronic data transmission scheduling system of claim 6, wherein the electronic reliability checker comprises a first field-programmable gate array (FPGA), wherein the electronic bandwidth checker comprises a second field-programmable gate array (FPGA), and wherein the electronic resource planner comprises a third field-programmable gate array (FPGA).

13. The electronic data transmission scheduling system of claim 6, wherein the electronic reliability checker determines the network mapping reliability score for the network topology relative to a predetermined reliability requirement, wherein the electronic reliability checker further determines the network mapping reliability score by calculating a lower reliability bound.

14. An electronic data transmission scheduling system for a computer network having a plurality of computerized data transmission nodes and a plurality of electronic aggregators, wherein each computerized data transmission node of the plurality of computerized data transmission nodes has at least one data transmission link of a plurality of data transmission links to another computerized data transmission node of the plurality of computerized data transmission nodes, and wherein each electronic aggregator of the plurality of electronic aggregators forwards data to a set of computerized data transmission nodes of the plurality of computerized data transmission nodes, a configuration of the plurality of computerized data transmission nodes and the plurality of data transmission links collectively forming a network topology, the electronic data transmission scheduling system, comprising:
an electronic reliability checker that examines possible data transmission routes between computerized data transmission nodes of the plurality of computerized data transmission nodes and data transmission links of the plurality of data transmission links to determine a network mapping reliability score for the network topology, wherein the network mapping reliability score represents a probability that an electronic aggregator of the plurality of the electronic aggregators connects to at least one computerized data transmission node of a set of computerized data transmission nodes given computerized data transmission node and data transmission link failure probabilities;
an electronic bandwidth checker configured to calculate bandwidth allocations and a flow routing plan for the network topology, wherein the electronic bandwidth checker develops calculated bandwidth allocations and the flow routing plan by testing different combinations of data transmission links from the plurality of data transmission links and different combinations computerized data transmission nodes of the plurality of computerized data transmission nodes; and
an electronic resource planner that applies the network mapping reliability score from the electronic reliability checker, traffic characteristics and demands, and the calculated bandwidth allocations and the flow routing plan from the electronic bandwidth checker to evaluate and develop a computer-implementable deployment strategy that directs rearrangement of the network topology, by calculating and evaluating a trade-off between the network mapping reliability score, estimated bandwidth demands, the calculated bandwidth allocations and the flow routing plan that satisfies predetermined requirements for reliability and bandwidth; and
an electronic flow delay checker that determines a flow routing plan and an end-to-end delay of delivering a data packet from a sending computerized data transmission node of the plurality of computerized processing nodes to a destination computerized data transmission node of the plurality of computerized processing nodes over at least one data transmission link of a plurality of data transmission links,
wherein the electronic flow delay checker evaluates whether a flow routing plan and calculated end-to-end delays satisfies estimated traffic characteristics and flow demands, calculated bandwidth allocations and predetermined end-to-end delay requirements,
wherein the electronic resource planner is further configured to use the calculated end-to-end delay and flow routing plan along with the network mapping reliability score from the electronic reliability checker, traffic characteristics and demands, the calculated bandwidth allocation from the electronic bandwidth checker to evaluate and develop a computer-implementable deployment strategy that directs rearrangement of the network topology by calculating trade-offs among the network mapping reliability score, traffic characteristics and demands, the calculated bandwidth allocation, and calculated end-to-end delay that satisfies predetermined requirements for reliability, bandwidth and end-to-end delay.

15. The electronic data transmission scheduling system of claim 14, wherein the electronic flow delay checker determines the end-to-end delay by calculating a worst-case end-to-end delay bound in sending the data packet from the sending computerized data transmission node of the plurality of computerized processing nodes to the destination computerized data transmission node of the plurality of computerized processing nodes over the at least one data transmission link of a plurality of data transmission links.

16. The electronic data transmission scheduling system of claim 14, wherein the electronic bandwidth checker calculates bandwidth allocations and the flow routing plan for the network topology to ensure flow routability in line with predetermined bandwidth requirements, by evaluating routability of different combinations of inter-traffic between computerized data transmission nodes in the plurality of computerized data transmission nodes given the network topology and estimated traffic characteristics and flow demands, wherein the network topology comprises a mapping of the plurality of computerized data transmission nodes to the network topology and associations between computerized data transmission nodes and the plurality of computerized data transmission nodes.

17. The electronic data transmission scheduling system of claim 16,
   wherein the electronic bandwidth checker further calculates bandwidth allocations for the network topology by computing whether all flows can be routed without overloading any transmission links from the plurality of data transmission links relative to predetermined bandwidth constraints, with all possible paths, and
   wherein the electronic bandwidth checker calculates the bandwidth allocations for the network topology by calculating a maximum concurrent flow, according to an equation:

maximize s.t.:

$$\lambda \quad (15)$$

$$\sum_{K:e \in K} X(K) \leq u_e, \forall\, e \in E \quad (16)$$

$$\sum_{K \in k_f} X(K) \geq \lambda d_f, \forall\, f \in F \quad (17)$$

$$X(K) \geq 0, \forall\, K. \quad (18)$$

18. The electronic data transmission scheduling system of claim 14, wherein the electronic reliability checker comprises a first field-programmable gate array (FPGA), wherein the electronic bandwidth checker comprises a second field-programmable gate array (FPGA), wherein the electronic resource planner comprises a third field-programmable gate array (FPGA), and wherein the electronic flow delay checker comprises a fourth field-programmable gate array (FPGA).

19. The electronic data transmission scheduling system of claim 14, wherein the electronic reliability checker determines the network mapping reliability score for the network topology relative to a predetermined reliability requirement, wherein the electronic reliability checker further determines the network mapping reliability score by calculating a lower reliability bound.

20. The electronic data transmission scheduling system of claim 14,
   wherein the electronic resource planner calculates the mapping and association of the network traffic by randomly adding or removing a computerized data transmission node of the plurality of computerized processing nodes using an existing network topology map, wherein the electronic resource planning calculates a computer-implementable cost (energy) function for evaluating a new solution as:

$$\text{cost} = \min\left(0,\; \log_{10} \frac{1 - R_{min}}{1 - \beta},\; \lambda - 1\right).$$

* * * * *